United States Patent
Hakamata et al.

(10) Patent No.: US 7,485,890 B2
(45) Date of Patent: Feb. 3, 2009

(54) LINE LIGHT SOURCE DEVICE AND IMAGE INFORMATION READ-OUT APPARATUS

(75) Inventors: Kazuo Hakamata, Kanagawa-ken (JP); Naoto Iwakiri, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/086,293

(22) Filed: Mar. 23, 2005

(65) Prior Publication Data
US 2005/0211933 A1   Sep. 29, 2005

(30) Foreign Application Priority Data

Mar. 24, 2004 (JP) .............................. 2004-086856
Feb. 24, 2005 (JP) .............................. 2005-048983

(51) Int. Cl.
*G03B 42/08* (2006.01)
(52) U.S. Cl. ..................................... 250/591; 250/585
(58) Field of Classification Search ................. 250/585, 250/591
See application file for complete search history.

(56) References Cited

U.S. PATENT DOCUMENTS 4,922,100 A * 5/1990 Takeuchi .................... 250/584
5,336,978 A * 8/1994 Alessio ..................... 315/169.3
6,268,614 B1   7/2001 Imai
6,353,291 B1 * 3/2002 Borgogno et al. ......... 315/169.3
6,376,857 B1   4/2002 Imai
6,376,867 B1   4/2002 Gutierrez-Aitken et al.
6,614,045 B2 * 9/2003 Shoji ........................... 250/591
6,642,650 B1 * 11/2003 Struye et al. ................. 313/502
2003/0057386 A1   3/2003 Imai et al.

FOREIGN PATENT DOCUMENTS

JP   2000-338297 A   12/2000

* cited by examiner

*Primary Examiner*—Constantine Hannaher
(74) *Attorney, Agent, or Firm*—Sughrue Mion, PLLC

(57) ABSTRACT

An EL layer is located between a linear electrode and an opposite electrode, which stands facing the linear electrode, either one of the linear electrode and the opposite electrode being constituted of a light transmissive electrode. Electric power is supplied across the EL layer, which is located between the linear electrode and the opposite electrode, via the linear electrode and the opposite electrode. An optical intensity of light radiated out from the EL layer, across which the electric power has been supplied, is detected. The electric power, which is supplied across the EL layer, is controlled such that the thus detected optical intensity and a predetermined optical intensity, which has been set previously, become approximately identical with each other.

21 Claims, 10 Drawing Sheets

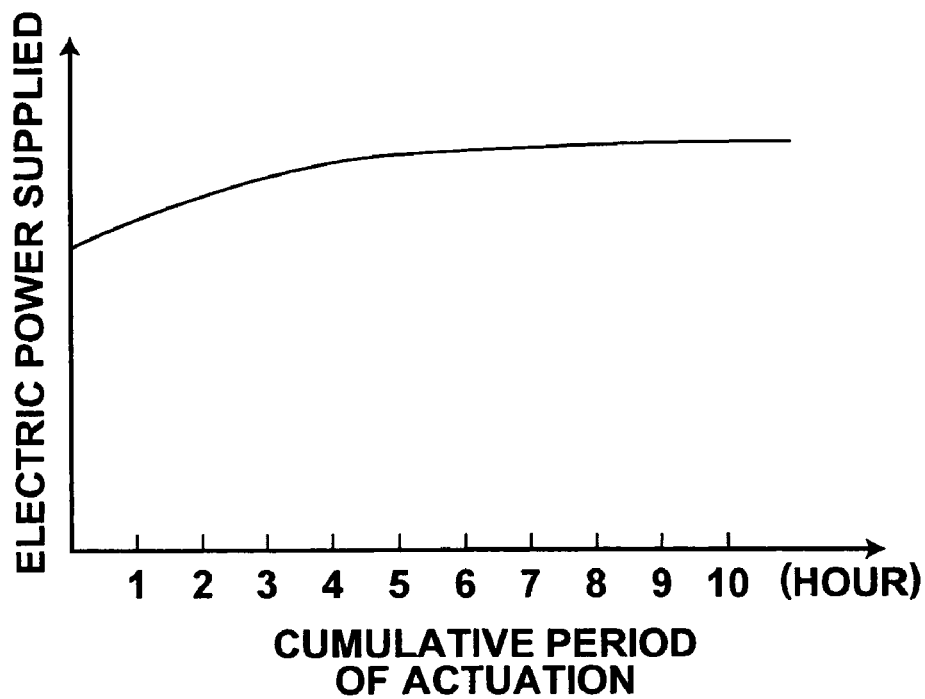

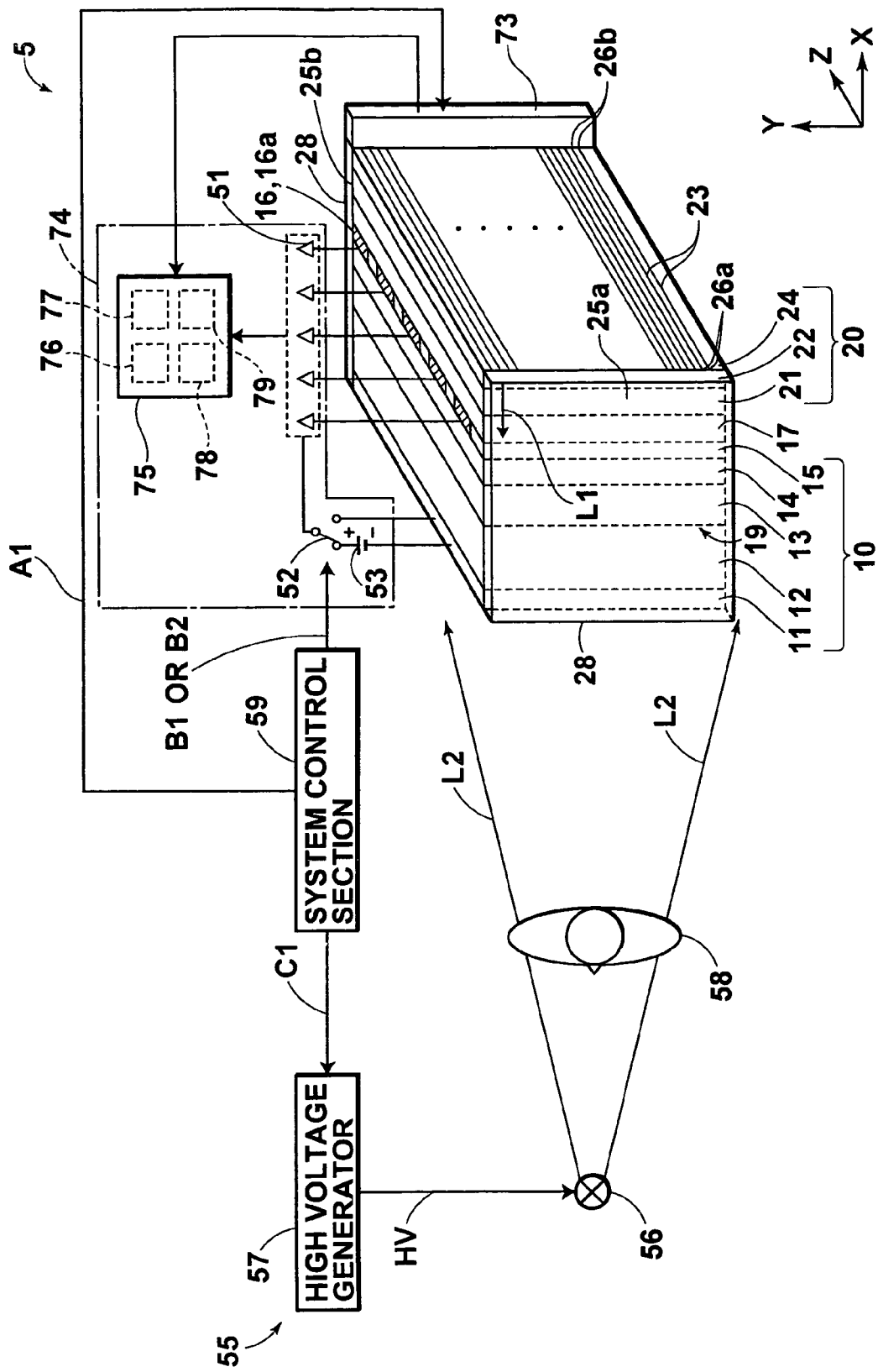

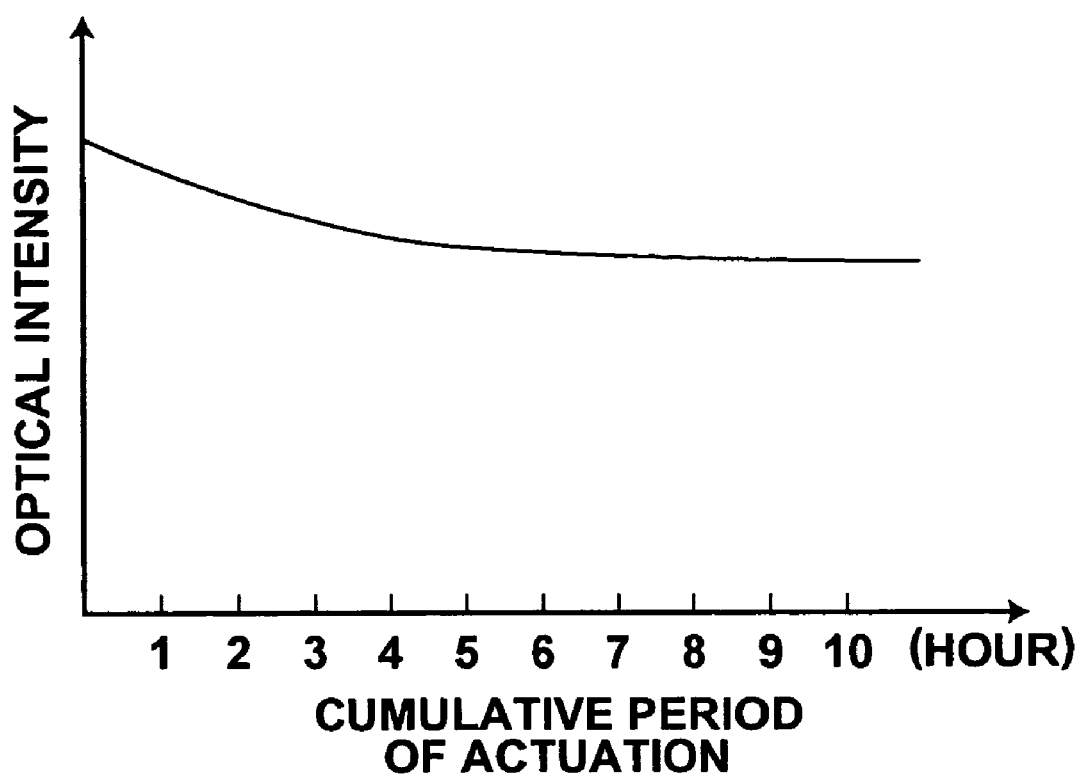

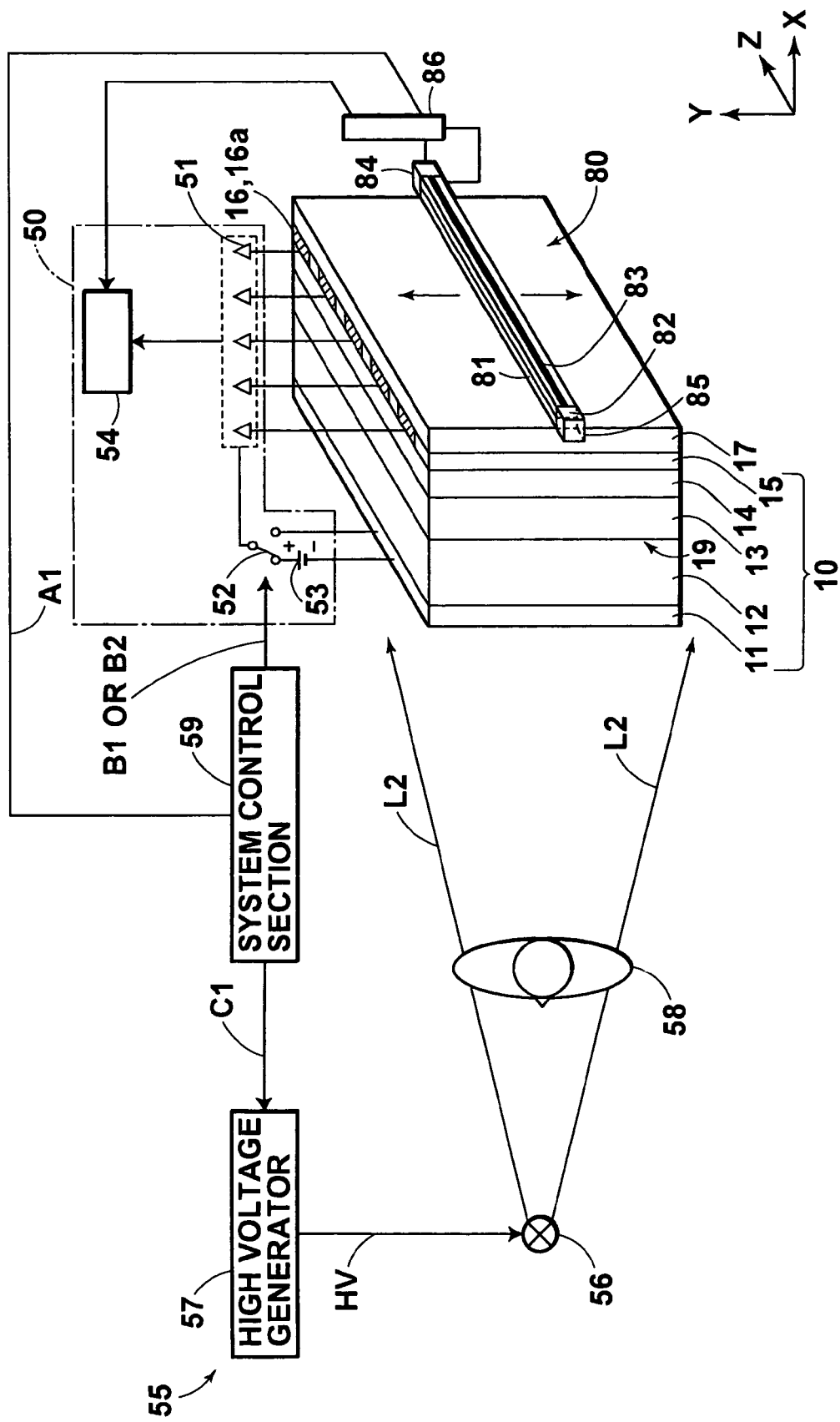

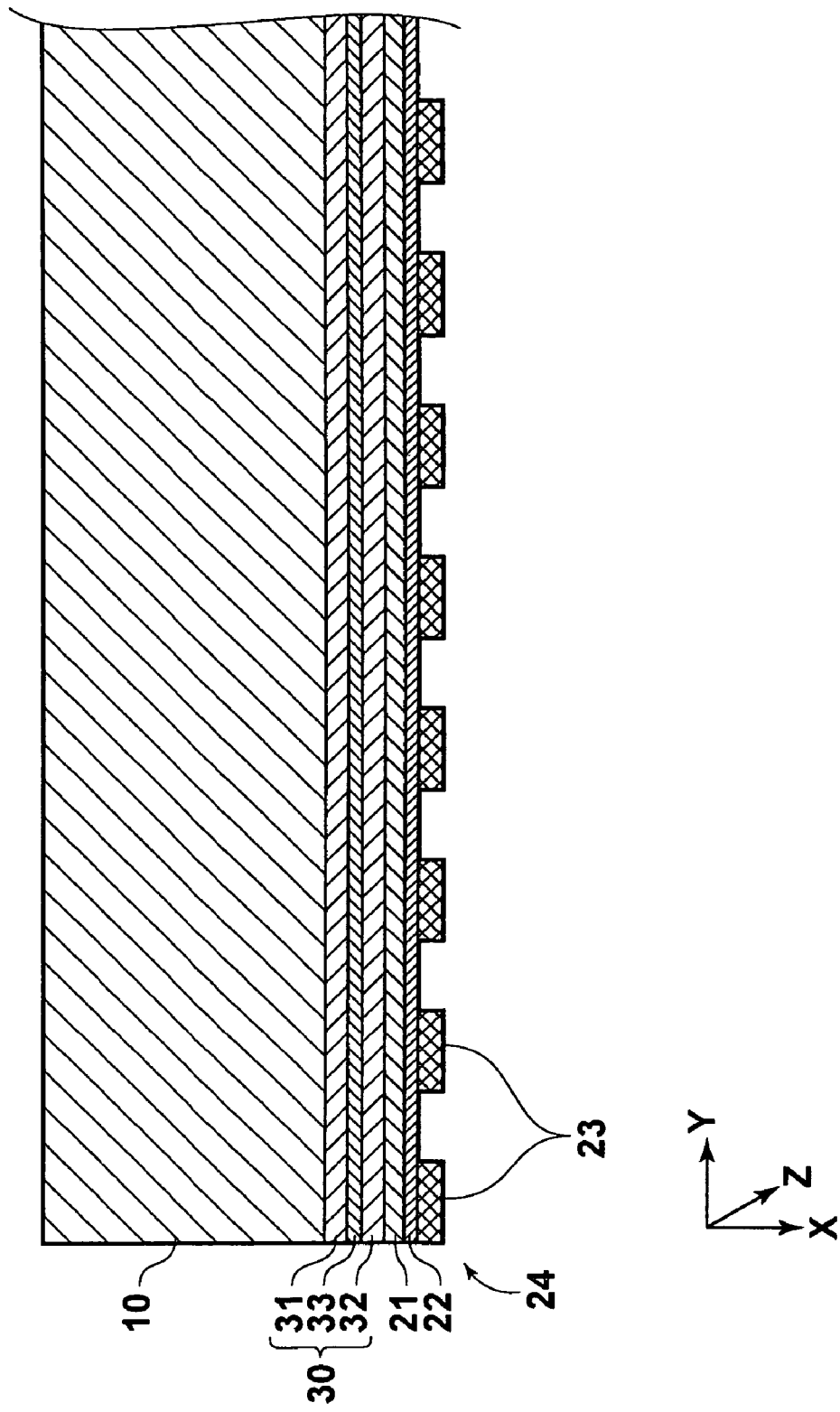

LINE LIGHT SOURCE DEVICE AND IMAGE INFORMATION READ-OUT APPARATUS

BACKGROUND OF THE INVENTION

1. Field of the Invention

This invention relates to a line light irradiating method and a line light source device for use in, for example, an operation for irradiating reading light to an image recording medium, on which image information has been recorded, in order to read out the recorded image information from the image recording medium. This invention particularly relates to a line light irradiating method and a line light source device, in which an electroluminescent layer is utilized. This invention also relates to an image information read-out method and apparatus utilizing the line light source device.

2. Description of the Related Art

Image information recording and read-out systems, in which electrostatic recording materials are utilized, have heretofore been proposed. With the proposed image information recording and read-out systems, such that a radiation dose delivered to an object during a medical X-ray image recording operation may be kept small, and such that the image quality of an image and its capability of serving as an effective tool in, particularly, the efficient and accurate diagnosis of an illness may be enhanced, a photo-conductive material sensitive to X-rays, such as a selenium plate constituted of, e.g., amorphous selenium (a-Se), is employed as an electrostatic recording material. The electrostatic recording material is exposed to radiation, such as X-rays, carrying radiation image information, and latent image charges carrying the radiation image information are thereby accumulated in the electrostatic recording material. Thereafter, the electrostatic recording material is scanned with a line light beam, which has been radiated out from a line light source, and currents occurring in the electrostatic recording material are detected via a striped electrode. In this manner, the electrostatic latent image represented by the latent image charges, i.e. the radiation image information, is read out. (The image information recording and read-out systems, in which the electrostatic recording materials are utilized, are described in, for example, U.S. Pat. No. 6,268,614.)

Also, image information recording and read-out systems, in which stimulable phosphor sheets are utilized as recording media, have heretofore been proposed. With the proposed image information recording and read-out systems, a stimulable phosphor sheet, on which radiation image information has been stored, is scanned with a line light beam, which has been radiated out from a line light source and which acts as reading light (stimulating rays) for causing the stimulable phosphor sheet to emit light in proportion to the amount of energy stored on the stimulable phosphor sheet during exposure of the stimulable phosphor sheet to radiation. Also, the light, which is emitted by the stimulable phosphor sheet when the stimulable phosphor sheet is exposed to the line light beam, is detected. In this manner, the image information, which has been stored on the stimulable phosphor sheet, is read out. As a detecting section for detecting the light emitted by the stimulable phosphor sheet, a photodiode image sensor, a charge coupled device (CCD) image sensor, or a panel-shaped or line-shaped detector, which is provided with a photo-conductive layer capable of exhibiting electrical conductivity when being exposed to the light emitted by the stimulable phosphor sheet. (The image information recording and read-out systems, in which the stimulable phosphor sheets are utilized as the recording media, are described in, for example, Japanese Unexamined Patent Publication No. 2000-338297.)

Further, in order for a read-out speed to be kept high, there has been proposed a scanning exposure apparatus, wherein a panel-shaped light source constituted of a plurality of line light sources, which are located at approximately identical pitches and in parallel with one another, is provided. With the proposed scanning exposure apparatus, line light beams are successively radiated out with different timing from the panel-shaped light source, and the scanning exposure with the line light beams is thereby performed. (The proposed scanning exposure apparatus provided with the panel-shaped light source is described in, for example, U.S. Pat. No. 6,376,857.) The proposed scanning exposure apparatus utilizes the line light sources, each of which comprises a light transmissive linear electrode, a planar electrode, and an electroluminescent (EL) layer located between the linear electrode and the planar electrode. Also, an electric current is successively caused to flow through the light transmissive linear electrodes of the line light sources, and the line light beams are thereby successively radiated out from the panel-shaped light source. As the material for the light transmissive linear electrodes, indium tin oxide (ITO) is utilized.

However, with the line light source utilizing the EL layer described above, the problems with regard to EL characteristics are encountered in that, as the cumulative period of actuation of the EL layer becomes long, in cases where predetermined electric power is supplied across the EL layer, the optical intensity of the line light beam radiated out from the EL layer becomes low.

SUMMARY OF THE INVENTION

The primary object of the present invention is to provide a line light irradiating method, wherein an EL layer is utilized and wherein problems are capable of being prevented from occurring in that, as a cumulative period of actuation of the EL layer becomes long, an optical intensity of a line light beam radiated out from the EL layer becomes low.

Another object of the present invention is to provide a line light source device, wherein an EL layer is utilized and wherein problems are capable of being prevented from occurring in that, as a cumulative period of actuation of the EL layer becomes long, an optical intensity of a line light beam radiated out from the EL layer becomes low.

A further object of the present invention is to provide an image information read-out method, wherein the line light source device is utilized.

A still further object of the present invention is to provide an apparatus for carrying out the image information read-out method, wherein the line light source device is utilized.

Another object of the present invention is to provide an image information read-out method, wherein reliability of image information having been read out is capable of being kept high in cases where, as a cumulative period of actuation of an EL layer becomes long, an optical intensity of a line light beam radiated out from the EL layer becomes low.

A further object of the present invention is to provide an apparatus for carrying out the image information read-out method, wherein the reliability of the image information having been read out is capable of being kept high in cases where, as the cumulative period of actuation of the EL layer becomes long, the optical intensity of the line light beam radiated out from the EL layer becomes low.

The present invention provides a first line light irradiating method, comprising the steps of:

i) locating an electroluminescent layer between a linear electrode and an opposite electrode, which stands facing the linear electrode, either one of the linear electrode and the opposite electrode being constituted of a light transmissive electrode, ii) supplying electric power across the electroluminescent layer, which is located between the linear electrode and the opposite electrode, via the linear electrode and the opposite electrode, iii) detecting an optical intensity of light radiated out from the electroluminescent layer, across which the electric power has been supplied, and iv) controlling the electric power, which is supplied across the electroluminescent layer, such that the thus detected optical intensity and a predetermined optical intensity, which has been set previously, become approximately identical with each other.

The present invention also provides a first line light source device, comprising:

i) a light source section provided with:
a) a linear electrode,
b) an opposite electrode, which stands facing the linear electrode, and
c) an electroluminescent layer, which is located between the linear electrode and the opposite electrode,
either one of the linear electrode and the opposite electrode being constituted of a light transmissive electrode, and ii) electric power supplying means for supplying electric power across the electroluminescent layer, which is located between the linear electrode and the opposite electrode, via the linear electrode and the opposite electrode, wherein the line light source device further comprises optical intensity detecting means for detecting an optical intensity of light radiated out from the electroluminescent layer, across which the electric power has been supplied, and the electric power supplying means controls the electric power, which is supplied across the electroluminescent layer, such that the optical intensity, which has been detected by the optical intensity detecting means, and a predetermined optical intensity, which has been set previously, become approximately identical with each other.

The term "light transmissive electrode" as used herein means the electrode, which has transmissivity to the light radiated out from the electroluminescent layer. Also, the term "line light source device" as used herein means the light source device, which produces one line light beam. In cases where a plurality of line light source devices are used in combination, the electroluminescent layer or the opposite electrode may be located with respect to each of the linear electrodes. Alternatively, a planar electroluminescent layer or a planar opposite electrode may be located with respect to a predetermined number of the linear electrodes.

The first line light irradiating method in accordance with the present invention may be modified such that an optical intensity of light, which is radiated out from an end face of the electroluminescent layer, is detected as the optical intensity of the light radiated out from the electroluminescent layer. Also, the first line light source device in accordance with the present invention may be modified such that the optical intensity detecting means detects an optical intensity of light, which is radiated out from an end face of the electroluminescent layer, as the optical intensity of the light radiated out from the electroluminescent layer.

The present invention further provides a second line light irradiating method, comprising the steps of:

i) locating an electroluminescent layer between a linear electrode and an opposite electrode, which stands facing the linear electrode, either one of the linear electrode and the opposite electrode being constituted of a light transmissive electrode, ii) supplying electric power across the electroluminescent layer, which is located between the linear electrode and the opposite electrode, via the linear electrode and the opposite electrode, iii) storing information, which represents a cumulative period of actuation of the electroluminescent layer located between the linear electrode and the opposite electrode, iv) previously storing information representing a relationship between a cumulative period of actuation of an equivalent electroluminescent layer, which is equivalent to the electroluminescent layer located between the linear electrode and the opposite electrode, and electric power, which is to be supplied across the equivalent electroluminescent layer such that light having a predetermined optical intensity having been set previously is radiated out from the equivalent electroluminescent layer, and v) controlling the electric power, which is supplied across the electroluminescent layer located between the linear electrode and the opposite electrode, such that the light having the predetermined optical intensity is radiated out from the electroluminescent layer, the electric power being controlled in accordance with the cumulative period of actuation of the electroluminescent layer located between the linear electrode and the opposite electrode, which cumulative period of actuation has been measured and stored, and the relationship, which has been acquired with respect to the equivalent electroluminescent layer and stored.

The present invention still further provides a second line light source device, comprising:

i) a light source section provided with:
a) a linear electrode,
b) an opposite electrode, which stands facing the linear electrode, and
c) an electroluminescent layer, which is located between the linear electrode and the opposite electrode,
either one of the linear electrode and the opposite electrode being constituted of a light transmissive electrode, and ii) electric power supplying means for supplying electric power across the electroluminescent layer, which is located between the linear electrode and the opposite electrode, via the linear electrode and the opposite electrode, wherein the line light source device further comprises:
cumulative actuation period storing means for storing information, which represents a cumulative period of actuation of the electroluminescent layer located between the linear electrode and the opposite electrode, and first storage means for previously storing information representing a relationship between a cumulative period of actuation of an equivalent electroluminescent layer, which is equivalent to the electroluminescent layer located between the linear electrode and the opposite electrode, and electric power, which is to be supplied across the equivalent electroluminescent layer such that light having a predetermined optical intensity having been set previously is radiated out from the equivalent electroluminescent layer, and the electric power supplying means controls the electric power, which is supplied across the electroluminescent layer located between the linear electrode and the opposite electrode, such that the light having the predetermined optical intensity is radiated out from the electroluminescent layer, the electric power being controlled in accordance with the cumulative period of actuation of the electroluminescent layer located between the linear electrode and the opposite electrode, which cumulative period of actuation has been measured and stored in the cumulative actuation period storing means, and the relationship, which has been acquired with respect to the equivalent electroluminescent layer and stored in the first storage means.

Each of the first and second line light irradiating methods in accordance with the present invention and the first and second line light source devices in accordance with the present invention may be modified such that an end face of the electroluminescent layer is covered with a light absorbing member. In such cases, the light absorbing member may cover at least part of the end face of the electroluminescent layer. Alternatively, the light absorbing member may cover the entire area of the end face of the electroluminescent layer. Also, in cases where the optical intensity detecting means is constituted so as to detect the optical intensity of the light, which is radiated out from the end face of the electroluminescent layer, as the optical intensity of the light radiated out from the electroluminescent layer, the optical intensity detecting means should preferably be constituted so as to act also as the light absorbing member. Further, the light absorbing member may cover both the end face of the electroluminescent layer and the end face of the light transmissive electrode.

The present invention also provides a first image information read-out method, comprising the steps of:

i) obtaining an image recording medium, on which image information has been recorded previously, and ii) performing a scanning exposure operation for scanning the image recording medium with reading light, which has been radiated out from a line light source device, at the time of readout of the image information from the image recording medium, wherein the line light source device comprises:
1) a light source section provided with:
a) a linear electrode,
b) an opposite electrode, which stands facing the linear electrode, and
c) an electroluminescent layer, which is located between the linear electrode and the opposite electrode,
either one of the linear electrode and the opposite electrode being constituted of a light transmissive electrode, 2) electric power supplying means for supplying electric power across the electroluminescent layer, which is located between the linear electrode and the opposite electrode, via the linear electrode and the opposite electrode, and 3) optical intensity detecting means for detecting an optical intensity of light radiated out from the electroluminescent layer, across which the electric power has been supplied, the electric power supplying means controlling the electric power, which is supplied across the electroluminescent layer, such that the optical intensity, which has been detected by the optical intensity detecting means, and a predetermined optical intensity, which has been set previously, become approximately identical with each other.

The present invention further provides a first image information read-out apparatus, comprising:

i) an image recording medium, on which image information has been recorded previously, ii) a line light source device for radiating out reading light toward the image recording medium, and iii) scanning exposure control section for performing a scanning exposure operation for scanning the image recording medium with the reading light, which has been radiated out from the line light source device, at the time of readout of the image information from the image recording medium, wherein the line light source device comprises:
1) a light source section provided with:
a) a linear electrode,
b) an opposite electrode, which stands facing the linear electrode, and
c) an electroluminescent layer, which is located between the linear electrode and the opposite electrode,
either one of the linear electrode and the opposite electrode being constituted of a light transmissive electrode, 2) electric power supplying means for supplying electric power across the electroluminescent layer, which is located between the linear electrode and the opposite electrode, via the linear electrode and the opposite electrode, and 3) optical intensity detecting means for detecting an optical intensity of light radiated out from the electroluminescent layer, across which the electric power has been supplied, the electric power supplying means controlling the electric power, which is supplied across the electroluminescent layer, such that the optical intensity, which has been detected by the optical intensity detecting means, and a predetermined optical intensity, which has been set previously, become approximately identical with each other.

Each of the first image information read-out method and the first image information read-out apparatus in accordance with the present invention may be modified such that the optical intensity detecting means detects an optical intensity of light, which is radiated out from an end face of the electroluminescent layer, as the optical intensity of the light radiated out from the electroluminescent layer.

Also, the first image information read-out method in accordance with the present invention may be modified such that the line light source device is subjected to an aging operation before being used for the readout of the image information from the image recording medium, image correction data is acquired after the optical intensity of the reading light, which is radiated out from the line light source device having been subjected to the aging operation, has become approximately equal to a predetermined value due to the aging operation, and the image information, which has been read out from the image recording medium, is corrected in accordance with the thus acquired image correction data.

Further, the first image information read-out apparatus in accordance with the present invention may be modified such that the apparatus further comprises image information correcting means for correcting the image information, which has been read out from the image recording medium, the line light source device is subjected to an aging operation before being used for the readout of the image information from the image recording medium, image correction data is acquired after the optical intensity of the reading light, which is radiated out from the line light source device having been subjected to the aging operation, has become approximately equal to a predetermined value due to the aging operation, and the image information correcting means corrects the image information, which has been read out from the image recording medium, in accordance with the thus acquired image correction data.

The state, in which the optical intensity of the reading light has become approximately equal to a predetermined value, is the state, in which little alteration occurs with the optical intensity of the reading light in cases where the cumulative period of actuation of the line light source device becomes long.

The present invention still further provides a second image information read-out method, comprising the steps of:

i) obtaining an image recording medium, on which image information has been recorded previously, and ii) performing a scanning exposure operation for scanning the image recording medium with reading light, which has been radiated out from a line light source device, at the time of readout of the image information from the image recording medium, wherein the line light source device comprises:

1) a light source section provided with:

a) a linear electrode, b) an opposite electrode, which stands facing the linear electrode, and c) an electroluminescent layer, which is located between the linear electrode and the opposite electrode, either one of the linear electrode and the opposite electrode being constituted of a light transmissive electrode, and 2) electric power supplying means for supplying electric power across the electroluminescent layer, which is located between the linear electrode and the opposite electrode, via the linear electrode and the opposite electrode, and the method further comprises the steps of:

storing information, which represents a cumulative period of actuation of the electroluminescent layer located between the linear electrode and the opposite electrode, previously storing information representing a relationship between a cumulative period of actuation of an equivalent electroluminescent layer, which is equivalent to the electroluminescent layer located between the linear electrode and the opposite electrode, and an optical intensity of light, which is radiated out from the equivalent electroluminescent layer in cases where electric power having been set is supplied across the equivalent electroluminescent layer, forming correction data in accordance with the cumulative period of actuation of the electroluminescent layer located between the linear electrode and the opposite electrode, which cumulative period of actuation has been measured and stored, and the relationship, which has been acquired with respect to the equivalent electroluminescent layer and stored, and correcting the image information, which has been read out from the image recording medium, in accordance with the thus formed correction data.

The present invention also provides a second image information read-out apparatus, comprising:

i) an image recording medium, on which image information has been recorded previously, ii) a line light source device for radiating out reading light toward the image recording medium, and iii) scanning exposure control section for performing a scanning exposure operation for scanning the image recording medium with the reading light, which has been radiated out from the line light source device, at the time of readout of the image information from the image recording medium, wherein the line light source device comprises:

1) a light source section provided with:

a) a linear electrode, b) an opposite electrode, which stands facing the linear electrode, and c) an electroluminescent layer, which is located between the linear electrode and the opposite electrode, either one of the linear electrode and the opposite electrode being constituted of a light transmissive electrode, and 2) electric power supplying means for supplying electric power across the electroluminescent layer, which is located between the linear electrode and the opposite electrode, via the linear electrode and the opposite electrode, and the apparatus further comprises:

cumulative actuation period storing means for storing information, which represents a cumulative period of actuation of the electroluminescent layer located between the linear electrode and the opposite electrode, second storage means for previously storing information representing a relationship between a cumulative period of actuation of an equivalent electroluminescent layer, which is equivalent to the electroluminescent layer located between the linear electrode and the opposite electrode, and an optical intensity of light, which is radiated out from the equivalent electroluminescent layer in cases where electric power having been set is supplied across the equivalent electroluminescent layer, correction data forming means for forming correction data in accordance with the cumulative period of actuation of the electroluminescent layer located between the linear electrode and the opposite electrode, which cumulative period of actuation has been measured and stored in the cumulative actuation period storing means, and the relationship, which has been acquired with respect to the equivalent electroluminescent layer and stored in the second storage means, and image correcting means for correcting the image information, which has been read out from the image recording medium, in accordance with the thus formed correction data.

Each of the first image information read-out method and apparatus in accordance with the present invention and the second image information read-out method and apparatus in accordance with the present invention may be modified such that the image recording medium is an electrostatic recording material, which is capable of recording the image information as an electrostatic latent image, and which is capable of generating electric currents in accordance with the recorded electrostatic latent image when being scanned with the reading light.

Alternatively, each of the first image information read-out method and apparatus in accordance with the present invention and the second image information read-out method and apparatus in accordance with the present invention may be modified such that the image recording medium is a stimulable phosphor sheet, which is capable of storing the image information, and which is capable of emitting light in accordance with the stored image information when being scanned with the reading light.

The term "equivalent electroluminescent layer" as used herein means the electroluminescent layer, which is constituted such that at least the composition and the thickness of the electroluminescent layer are identical with those of the electroluminescent layer located between the linear electrode and the opposite electrode. The equivalent electroluminescent layer may be an electroluminescent layer, which is constituted such that the composition and the shape of the electroluminescent layer are identical with those of the electroluminescent layer located between the linear electrode and the opposite electrode, and which has been located between the linear electrode and the opposite electrode.

With each of the first line light irradiating method in accordance with the present invention and the first line light source device in accordance with the present invention, the electroluminescent layer is located between the linear electrode and the opposite electrode, which stands facing the linear electrode, either one of the linear electrode and the opposite electrode being constituted of the light transmissive electrode. The electric power is supplied across the electroluminescent layer, which is located between the linear electrode and the opposite electrode, via the linear electrode and the opposite electrode. Also, the optical intensity of the light radiated out from the electroluminescent layer, across which the electric power has been supplied, is detected. Further, the electric power, which is supplied across the electroluminescent layer, is controlled such that the thus detected optical intensity and the predetermined optical intensity, which has been set previously, become approximately identical with each other. Therefore, with each of the first line light irradiating method in accordance with the present invention and the first line light source device in accordance with the present invention, the problems are capable of being prevented from occurring in that, as the cumulative period of actuation of the electroluminescent layer becomes long, the optical intensity of the line light beam radiated out from the electroluminescent layer becomes low.

With each of the first line light irradiating method in accordance with the present invention and the first line light source device in accordance with the present invention, wherein the optical intensity of the light, which is radiated out from the end face of the electroluminescent layer, is detected as the optical intensity of the light radiated out from the electroluminescent layer, the problems are capable of being prevented from occurring in that the line light beam, which is radiated out from the electroluminescent layer via the light transmissive electrode, is adversely affected by the operation for detecting the optical intensity of the line light beam.

With each of the second line light irradiating method in accordance with the present invention and the second line light source device in accordance with the present invention, the electroluminescent layer is located between the linear electrode and the opposite electrode, which stands facing the linear electrode, either one of the linear electrode and the opposite electrode being constituted of the light transmissive electrode. The electric power is supplied across the electroluminescent layer, which is located between the linear electrode and the opposite electrode, via the linear electrode and the opposite electrode. Also, the information representing the relationship between the cumulative period of actuation of the equivalent electroluminescent layer, which is equivalent to the electroluminescent layer located between the linear electrode and the opposite electrode, and the electric power, which is to be supplied across the equivalent electroluminescent layer such that the light having the predetermined optical intensity having been set previously is radiated out from the equivalent electroluminescent layer, is stored previously. Further, the electric power, which is supplied across the electroluminescent layer located between the linear electrode and the opposite electrode, is controlled such that the light having the predetermined optical intensity is radiated out from the electroluminescent layer, the electric power being controlled in accordance with the cumulative period of actuation of the electroluminescent layer located between the linear electrode and the opposite electrode and the relationship, which has been acquired with respect to the equivalent electroluminescent layer and stored. Therefore, with each of the second line light irradiating method in accordance with the present invention and the second line light source device in accordance with the present invention, the problems are capable of being prevented from occurring in that, as the cumulative period of actuation of the electroluminescent layer becomes long, the optical intensity of the line light beam radiated out from the electroluminescent layer becomes low.

With each of the first and second line light irradiating methods in accordance with the present invention and the first and second line light source devices in accordance with the present invention, wherein the end face of the electroluminescent layer is covered with the light absorbing member, the problems are capable of being prevented from occurring in that the light, which has been radiated out from the end face of the electroluminescent layer, is reflected from a casing for accommodating the line light source device, or the like, and acts as stray light.

With each of the first image information read-out method and apparatus in accordance with the present invention, the image recording medium, on which image information has been recorded previously, is obtained. Also, at the time of the readout of the image information from the image recording medium, the scanning exposure operation is performed for scanning the image recording medium with the reading light, which has been radiated out from the line light source device. The line light source device comprises the light source section provided with: (a) the linear electrode, (b) the opposite electrode, which stands facing the linear electrode, and (c) the electroluminescent layer, which is located between the linear electrode and the opposite electrode, either one of the linear electrode and the opposite electrode being constituted of the light transmissive electrode. The line light source device also comprises the electric power supplying means for supplying the electric power across the electroluminescent layer, which is located between the linear electrode and the opposite electrode, via the linear electrode and the opposite electrode. The line light source device further comprises the optical intensity detecting means for detecting the optical intensity of the light radiated out from the electroluminescent layer, across which the electric power has been supplied. The electric power supplying means controls the electric power, which is supplied across the electroluminescent layer, such that the optical intensity, which has been detected by the optical intensity detecting means, and the predetermined optical intensity, which has been set previously, become approximately identical with each other. Therefore, with each of the first image information read-out method and apparatus in accordance with the present invention, the alteration of the optical intensity of the reading light, which is radiated out from the line light source device, with the passage of time is capable of being suppressed, and the reliability of the image information having been read out from the image recording medium is capable of being enhanced.

With each of the first image information read-out method and apparatus in accordance with the present invention, wherein the end face of the electroluminescent layer is covered with the light absorbing member, the problems are capable of being prevented from occurring in that part of the line light beam, which is radiated out from the electroluminescent layer via the light transmissive electrode, is blocked by the optical intensity detecting means. Therefore, the reliability of the image information having been read out from the image recording medium is capable of being enhanced.

Each of the first image information read-out method and apparatus in accordance with the present invention may be modified such that the line light source device is subjected to the aging operation before being used for the readout of the image information from the image recording medium, the image correction data is acquired after the optical intensity of the reading light, which is radiated out from the line light source device having been subjected to the aging operation, has become approximately equal to the predetermined value due to the aging operation, and the image information, which has been read out from the image recording medium, is corrected in accordance with the thus acquired image correction data. In such cases, the image information, which has been read out from the image recording medium, is capable of being corrected accurately.

With each of the second image information read-out method and apparatus in accordance with the present invention, the image recording medium, on which image information has been recorded previously, is obtained. Also, at the time of the readout of the image information from the image recording medium, the scanning exposure operation is performed for scanning the image recording medium with the reading light, which has been radiated out from the line light source device. The line light source device comprises the light source section provided with: (a) the linear electrode, (b) the opposite electrode, which stands facing the linear electrode, and (c) the electroluminescent layer, which is located between the linear electrode and the opposite electrode, either one of the linear electrode and the opposite electrode being constituted of the light transmissive electrode. The line light source device also comprises the electric power supplying means for supplying the electric power across the electroluminescent layer, which is located between the linear electrode and the opposite electrode, via the linear electrode and the opposite electrode. Further, with each of the second image information read-out method and apparatus in accordance with the present invention, the information representing the relationship between the cumulative period of actuation of the equivalent electroluminescent layer, which is equivalent to the electroluminescent layer located between the linear electrode and the opposite electrode, and the optical intensity of the light, which is radiated out from the equivalent electroluminescent layer in cases where the electric power having been set is supplied across the equivalent electroluminescent layer, is stored previously. Furthermore, the correction data is formed in accordance with the cumulative period of actuation of the electroluminescent layer located between the linear electrode and the opposite electrode and the relationship, which has been acquired with respect to the equivalent electroluminescent layer and stored. Also, the image information, which has been read out from the image recording medium, is corrected in accordance with the thus formed correction data. Therefore, with each of the second image information read-out method and apparatus in accordance with the present invention, the reliability of the image information having been readout from the image recording medium is capable of being kept high in cases where, as the cumulative period of actuation of the EL layer becomes long, the optical intensity of the line light beam radiated out from the EL layer becomes low.

BRIEF DESCRIPTION OF THE DRAWINGS

FIG. 6 is a graph showing relationship between a cumulative period of actuation of an EL layer and electric power supplied across the EL layer, FIG. 7 is a schematic view showing an image information recording and read-out system, in which a fifth embodiment of the image information read-out apparatus in accordance with the present invention is employed, FIG. 8 is a graph showing aging characteristics of an EL layer, FIG. 9 is a schematic view showing an image information recording and read-out system, in which a modification of the image information read-out apparatus in accordance with the present invention is employed, and FIG. 10 is an explanatory sectional view showing part of a different example of a panel-shaped light source section.

DESCRIPTION OF THE PREFERRED EMBODIMENTS

The present invention will herein below be described in further detail with reference to the accompanying drawings.

Figure 1:
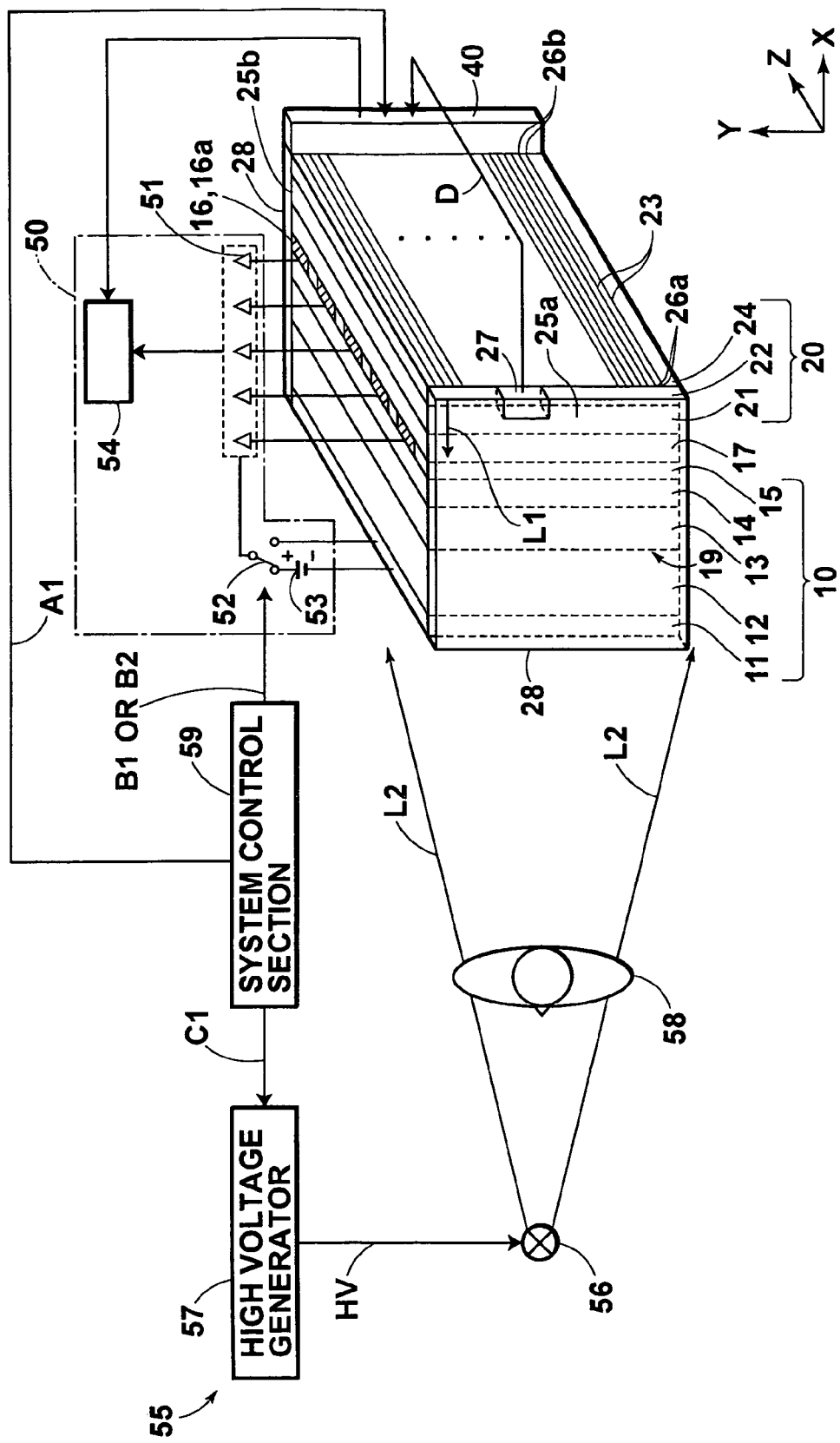
FIG. 1 is a schematic view showing an image information recording and read-out system, in which a first embodiment of the image information read-out apparatus in accordance with the present invention is employed.

FIG. 1 is a schematic view showing an image information recording and read-out system, in which a first embodiment of the image information read-out apparatus in accordance with the present invention is employed. With reference to FIG. 1, an image information recording and read-out system 1 comprises an image recording medium 10, which is capable of recording an electrostatic latent image having a size of 430 mm×430 mm thereon. The image information recording and read-out system 1 also comprises a panel-shaped light source section 20, which performs scanning exposure of the image recording medium 10 with reading light beams L1, L1, . . . The image information recording and read-out system 1 further comprises a scanning exposure control section 40, which controls an operation of the panel-shaped light source section 20. The image information recording and read-out system 1 still further comprises a reading section 50, which reads the image information from the image recording medium 10. The image information recording and read-out system 1 also comprises a radiation irradiating section 55, which irradiates radiation L2 acting as recording light toward the image recording medium 10. The image information recording and read-out system 1 further comprises a system control section 59, which is connected to the scanning exposure control section 40, the reading section 50, and the radiation irradiating section 55.

The image recording medium 10 comprises a first electrode layer (an electrical conductor layer) 11, a recording photo-conductive layer 12, a charge transporting layer 13, a reading photo-conductive layer 14, and a second electrode layer (an electrical conductor layer) 15. In cases where the radiation L2 (e.g., X-rays), which carries image information of an object 58, is irradiated to the first electrode layer 11, electric charges occur within the recording photo-conductive layer 12. The electric charges, which have occurred within the recording photo-conductive layer 12, are accumulated as latent image charges at a charge accumulating section 19, which constitutes the interface between the recording photo-conductive layer 12 and the charge transporting layer 13. In cases where the second electrode layer 15 is then scanned with each of the reading light beams L1, L1, . . . , electric charges occur within the reading photo-conductive layer 14. The electric charges, which have occurred within the reading photo-conductive layer 14, undergo charge re-combination with the latent image charges described above. As a result, electric currents in accordance with the amounts of the latent image charges occur. A transparent insulating layer 17, which is capable of transmitting the reading light beams L1, L1, . . . , is located on the side outward from the second electrode layer 15.

The second electrode layer 15 comprises a plurality of linear electrodes (hatched in FIG. 1), which are arrayed in a striped pattern. The electrode of the second electrode layer 15 will herein below be referred to as the striped electrode 16. Also, the linear electrodes constituting the striped electrode 16 will herein below be referred to as elements 16a, 16a, . . . Each of the recording photo-conductive layer 12, the charge transporting layer 13, and the reading photo-conductive layer 14 contains amorphous selenium (a-Se) as a principal constituent. As illustrated in FIG. 1, the direction, in which the recording photo-conductive layer 12, the charge transporting layer 13, the reading photo-conductive layer 14, the second electrode layer 15, and the insulating layer 17 are laminated together, is taken as the X direction. Also, the longitudinal direction of the striped electrode 16 is taken as the Y direction. Further, the direction, which is normal to the XY plane, is taken as the Z direction.

Figure 2:
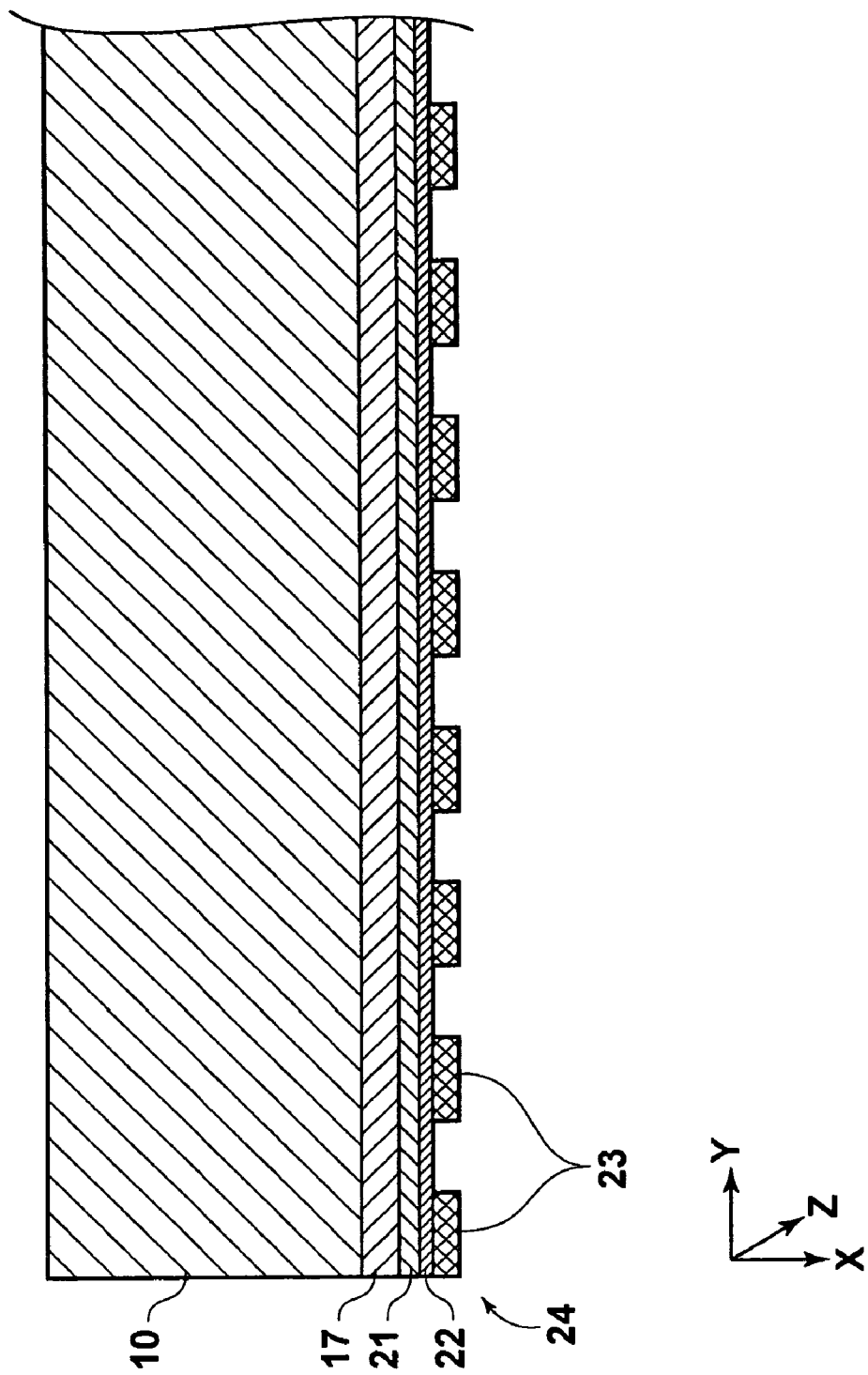
FIG. 2 is an explanatory sectional view showing part of an example of a panel-shaped light source section.

FIG. 2 is an explanatory sectional view showing part of the panel-shaped light source section 20, which sectional view is taken along the XY plane. As illustrated in FIG. 2, the panel-shaped light source section 20 comprises a planar light transmissive electrode 21, which is constituted of an ITO film having a thickness of 0.1 µm and a size of 430 mm (in the Z direction)×430 mm (in the Y direction). The panel-shaped light source section 20 also comprises an EL layer 22, which has a thickness of 0.1 µm and a size of 430 mm (in the Z direction)×430 mm (in the Y direction). The panel-shaped light source section 20 further comprises a linear electrode layer 24 provided with 4,300 linear electrodes 23, 23, . . . , which are arrayed in parallel and extend in the Z direction. Each of the linear electrodes 23, 23, . . . is constituted of an aluminum electrode having a width of 50 µm and a thickness of 0.3 µm. The linear electrodes 23, 23, . . . are arrayed at pitches of 100 µm. As illustrated in FIG. 2, the planar light transmissive electrode 2.1 is in contact with the insulating layer 17 so as to stand facing the image recording medium 10. The planar light transmissive electrode 21, the EL layer 22, and the linear electrode layer 24 are overlaid one upon the other so as to stand side by side with respect to the X direction. The EL layer 22 is constituted of an organic EL layer.

Reverting to FIG. 1, the light transmissive electrode 21 has end areas 25a and 25b, which are opposite to each other with respect to the Z direction. A predetermined positive voltage is applied to the end area 25a of the light transmissive electrode 21. Also, each of the linear electrodes 23, 23, . . . has end areas 26a and 26b, which are opposite to each other with respect to the Z direction. The end area 26b of each of the linear electrodes 23, 23, . . . , which end area is located on the side opposite to the side of the end area 25a of the light transmissive electrode 21, is connected to the scanning exposure control section 40. A predetermined negative voltage is applied to the end area 26b of each of the linear electrodes 23, 23, . . . Further, an optical intensity detecting section 27 is located at one of end areas of the EL layer 22, which end areas are opposite to each other with respect to the Z direction. The optical intensity detecting section 27 is located such that its light receiving section stands facing the end area of the EL layer 22. The optical intensity detecting section 27 converts the optical intensity of the received light into an electric signal and feeds the electric signal as an optical intensity signal D into the scanning exposure control section 40. The light receiving section of the optical intensity detecting section 27 has a size of 0.2 µm (in the X direction)×1 mm (in the Y direction). The optical intensity detecting section 27 is thus capable of detecting the optical intensities of the light beams, which are produced successively with actuation of ten linear electrodes 23, 23, . . . , with one detecting operation.

Entire areas of the end faces of the image recording medium 10 and the panel-shaped light source section 20, which end faces are parallel with the XY plane and are other than the site provided with the optical intensity detecting section 27, are covered with light absorbing members 28, 28. The optical intensity detecting section 27 also acts as the light absorbing member.

The combination of the linear electrodes 23, 23, . . . , the EL layer 22, the light transmissive electrode 21, the optical intensity detecting section 27, and the scanning exposure control section 40 acts as the line light source device in accordance with the present invention. In particular, the combination of the linear electrodes 23, 23, . . . , the EL layer 22, and the light transmissive electrode 21 acts as the light source section of the line light source device in accordance with the present invention. The scanning exposure control section 40 acts as the electric power supplying means of the line light source device in accordance with the present invention.

Before the image information recording and read-out system 1 is delivered to a user, the scanning exposure control section 40 is operated in order to supply the predetermined electric power to each of the linear electrodes 23, 23, . . . As a result, a predetermined electric current is caused to flow across the corresponding region of the EL layer 22. Also, the optical intensity signal D, which has been detected by the optical intensity detecting section 27, is stored as a reference optical intensity value in a memory (not shown) of the scanning exposure control section 40. In cases where the image information recording and read-out system 1 is used by the user for the image information read-out operation, a control signal A1 for instructing a read-out scanning operation is fed from the system control section 59 into the scanning exposure control section 40. In accordance with the control signal A1, the scanning exposure control section 40 operates in the manner described below. Specifically, the electric power is supplied to the end areas 26b, 26b, . . . of the linear electrodes 23, 23, . . . one after another. The electric currents are successively caused to flow across the regions of the EL layer 22, each of which regions is located between one of the linear electrodes 23, 23, . . . and the light transmissive electrode 21. The reading light beams L1, L1, . . . are thus successively radiated out with different timing from the panel-shaped light source section 20.

At the time of each read-out scanning operation, the value of the optical intensity signal D, which has been detected by the optical intensity detecting section 27, and the reference optical intensity value, which has been stored previously, are compared with each other. In cases where the value of the optical intensity signal D is smaller than the reference optical intensity value, the electric current flowing across the region of the EL layer 22, which region corresponds to each of the linear electrodes 23, 23, . . . , is set to be high. In cases where the value of the optical intensity signal D is larger than the reference optical intensity value, the electric current flowing across the region of the EL layer 22, which region corresponds to each of the linear electrodes 23, 23, . . . , is set to be low. Ordinarily, in cases where the amount of the electric current flowing across the EL layer 22 is kept at a predetermined value, the optical intensity of the light produced by the EL layer 22 becomes low little by little due to the alteration of the EL layer 22 with the passage of time. In this embodiment, as the cumulative period of actuation of the EL layer 22 becomes long, the electric current flowing across the EL layer 22 is altered to be large little by little so as to compensate for the adverse effect of the lowering of the optical intensity of the light, which is produced by the EL layer 22, due to the alteration of the EL layer 22 with the passage of time. Therefore, the optical intensity of the light, which is produced by the EL layer 22, is capable of being kept at the predetermined value.

The reading section 50 comprises a plurality of current detection amplifiers 51, 51, . . . , which are connected to inversion input terminals. Each of the current detection amplifiers 51, 51, . . . is provided for one of the elements 16a, 16a, . . . of the striped electrode 16. The first electrode layer 11 of the image recording medium 10 is connected to one of input terminals of a switch 52 and to a negative pole of an electric power source 53. A positive pole of the electric power source 53 is connected to the other input terminal of the switch 52. An output terminal of the switch 52 is connected commonly to each of non-inversion input terminals of operational amplifiers (not shown), each of which constitutes one of the current detection amplifiers 51, 51, . . .

At the time of the read-out scanning operation, each of the reading light beams L1, L1, . . . is irradiated toward the striped electrode 16 for the scanning exposure, and each of the current detection amplifiers 51, 51, . . . detects the electric current flowing across the corresponding one of the elements 16a, 16a, . . . The current detection amplifiers 51, 51, . . . thus detects the electric currents simultaneously (i.e., in a parallel manner) with respect to the elements 16a, 16a, . . . The results of the detection are outputted into a signal processing section 54. The signal processing section 54 successively receives exposed site information, which represents the site exposed to each of the reading light beams L1, L1, . . . , from the scanning exposure control section 40. Also, the signal processing section 54 stores the detection results, which have been received from the current detection amplifiers 51, 51, . . . , and the corresponding exposed site information. After the read-out scanning operation has been finished, the signal processing section 54 forms an image signal, which represents one image, in accordance with the detection results and the exposed site information.

The current detection amplifiers 51, 51, . . . may have one of various known constitutions. The manner in which the current detection amplifiers 51, 51, . . . are connected to the switch 52, the electric power source 53, and the elements 16a, 16a, . . . may vary for different constitutions of the current detection amplifiers 51, 51, . . . In this embodiment, in cases where a control signal B1 for instructing an image recording operation is received from the system control section 59, the connection of the switch 52 is changed over to the side of the electric power source 53. Also, in cases where a control signal B2 for instructing a read-out operation is received from the system control section 59, the connection of the switch 52 is changed over to the side of the first electrode layer 11.

The radiation irradiating section 55 comprises a radiation source 56, which produces the radiation L2, and a high voltage generator 57, which produces electric power for actuating the radiation source 56.

In cases where a control signal C1 for instructing a radiation irradiating operation is fed from the system control section 59 into the high voltage generator 57, the high voltage generator 57 applies a high voltage HV to the radiation source 56 and actuates the radiation source 56 to produce the radiation L2 for a predetermined period of time.

The system control section 59 outputs the control signal A1, which instructs the scanning exposure operation, to the scanning exposure control section 40. Also, the system control section 59 outputs the control signal B1, which instructs the image information recording operation, or the control signal B2, which instructs the image information read-out operation, to the switch 52. Further, the system control section 59 outputs the control signal C1, which instructs the operation for irradiating the radiation L2, to the high voltage generator 57.

How the image information recording and read-out system 1 having the constitution described above operates will be described herein below.

When the electrostatic latent image is to be recorded on the image recording medium 10, the voltage for the recording is applied across the electrode of the first electrode layer 11 and the striped electrode 16. Also, in this state, the radiation L2 for the recording is irradiated to the first electrode layer 11, and the electrostatic latent image is recorded on the image recording medium 10. Specifically, firstly, the system control section 59 outputs the control signal B1 to the switch 52, such that the electric charges occurring in the recording photo-conductive layer 12 of the image recording medium 10 are capable of being accumulated at the charge accumulating section 19. When the control signal B1 is received from the system control section 59, the connection of the switch 52 is changed over to the side of the electric power source 53, and a d.c. voltage of a predetermined level is applied as the recording voltage from the electric power source 53 across the electrode of the first electrode layer 11 and the striped electrode 16 of the image recording medium 10. As a result, the electrode of the first electrode layer 11 and the striped electrode 16 are electrostatically charged.

After the recording voltage has been applied across the electrode of the first electrode layer 11 and the striped electrode 16 of the image recording medium 10, the system control section 59 inputs the control signal C1 into the high voltage generator 57 and actuates the high voltage generator 57 to supply the high voltage HV to the radiation source 56. The radiation L2 is thus produced by the radiation source 56. The thus produced radiation L2 is irradiated to an object 58 and passes through the object 58. The radiation L2, which carries the radiation image information of the object 58, is irradiated to the image recording medium 10 for a predetermined irradiation time. As a result, pairs of positive and negative charges occur in the recording photo-conductive layer 12 of the image recording medium 10. Of the pairs of positive and negative charges, the negative charges are centralized upon the elements 16a, 16a, . . . of the striped electrode 16 along a predetermined electric field distribution. In this manner, the negative charges are accumulated as the latent image charges at the charge accumulating section 19, which is the interface between the recording photo-conductive layer 12 and the charge transporting layer 13. The amount of the accumulated latent image charges is approximately in proportion to the dose of radiation delivered to the image recording medium 10. Therefore, the latent image charges carry the electrostatic latent image. The positive charges occurring in the recording photo-conductive layer 12 are attracted to the first electrode layer 11, combine with negative charges injected from the electric power source 53, and disappear.

When the electrostatic latent image is to be read out from the image recording medium 10, the system control section 59 outputs the control signal B2 to the switch 52 in order to set the electrode of the first electrode layer 11 and the striped electrode 16 at an identical electric potential. Thereafter, the system control section 59 outputs the control signal A1 to the scanning exposure control section 40. In accordance with the control signal A1, the scanning exposure control section 40 supplies the electric power to the linear electrode 23, which is located at the top in FIG. 1. The electric current is thus caused to flow across the region of the EL layer 22, which region corresponds to the linear electrode 23 located at the top in FIG. 1. As described above, the amount of the electric current flowing at this time across the region of the EL layer 22, which region corresponds to the linear electrode 23 located at the top in FIG. 1, is the amount of the electric current having been adjusted in accordance with the optical intensity signal D, which has been detected at the time of the read-out scanning operation having been performed most recently, and the reference optical intensity value, which has been stored previously, so as to compensate for the adverse effect of the lowering of the optical intensity of the light, which is produced by the aforesaid region of the EL layer 22, due to the alteration of the EL layer 22 with the passage of time. The electric current is caused to flow across the aforesaid region of the EL layer 22 as described above, and the line light beam is produced by the aforesaid region of the EL layer 22. The line light beam, which has been radiated out from the aforesaid region of the EL layer 22, passes through the light transmissive electrode 21 and impinges as the reading light beam L1 upon the image recording medium 10. Thereafter, in the same manner, the electric power is supplied to the lower adjacent linear electrodes 23, 23, . . . one after another, and the reading light beams L1, L1, . . . are successively irradiated from the corresponding regions of the EL layer 22 to the image recording medium 10. Lastly, the electric power is supplied to the bottom linear electrode 23, and the reading light beam L1 is radiated out from the corresponding region of the EL layer 22. The scanning exposure of the image recording medium 10 with the reading light beams L1, L1, . . . is thus completed.

At the time at which the image recording medium 10 is scanned with each of the reading light beams L1, L1, . . . , pairs of positive and negative charges occur in the region of the reading photo-conductive layer 14, which region has been exposed to the reading light beam L1 corresponding to the scanning position. Of the pairs of positive and negative charges, the positive charges move quickly through the charge transporting layer 13 so as to be attracted by the negative charges (the latent image charges), which have been accumulated at the charge accumulating section 19. The positive charges combine with the latent image charges at the charge accumulating section 19 and disappear. The negative charges occurring in the reading photo-conductive layer 14 combine with positive charges, which are injected from the electric power source 53 into the striped electrode 16, and disappear. In this manner, the negative charges having been accumulated at the charge accumulating section 19 of the image recording medium 10 disappear through charge re-combination, and electric currents due to the movement of the electric charges at the time of the charge re-combination occur in the image recording medium 10. The electric currents are detected simultaneously by the current detection amplifiers 51, 51, . . . , each of which is connected to one of the elements 16a, 16a, . . . The results of the detection are fed from the current detection amplifiers 51, 51, . . . into the signal processing section 54.

The electric currents flowing through the image recording medium 10 at the time of the readout occur in accordance with the latent image charges, i.e. the electrostatic latent image. Therefore, the electrostatic latent image is capable of being read out, i.e. an image signal representing the electrostatic latent image is capable of being acquired, through the detection of the electric currents. The detection of the electric currents with the current detection amplifiers 51, 51, . . . is performed by being interlocked with the timing with which the positions of irradiation of the reading light beams L1, L1, . . . are changed over, i.e. the timing with which the actuated linear electrodes 23, 23, . . . are changed over. The image signal corresponding to 4,300 lines is thus acquired.

After the scanning exposure operation has been completed, the signal processing section 54 performs predetermined image processing on the image signal (i.e., the image information) having been read out and forms the display image information, which represents one image.

As described above, with this embodiment, the optical intensity of the light, which is radiated out from the end face of the EL layer 22 of the panel-shaped light source section 20, is detected. Also, the electric power, which is supplied to each of the linear electrodes 23, 23, . . . , is controlled such that the thus detected optical intensity and the reference optical intensity value, which has been stored previously, become approximately identical with each other. Therefore, the problems are capable of being prevented from occurring in that, as the cumulative period of actuation of the EL layer 22 becomes long, the optical intensity of each of the reading light beams L1, L1, . . . alters. Accordingly, the reliability of the image information having been read out from the image recording medium 10 is capable of being enhanced.

Further, since the optical intensity of the light, which is radiated out from the end face of the EL layer 22, is detected as the optical intensity of the light radiated out from the EL layer 22, the problems are capable of being prevented from occurring in that each of the reading light beams L1, L1, . . . is adversely affected by the operation for detecting the optical intensity of each of the reading light beams L1, L1, . . . Furthermore, since the light, which is radiated out from the end face of the EL layer 22, has a high optical intensity, the optical intensity is capable of being detected accurately.

Also, with this embodiment, the entire areas of the end faces of the image recording medium 10 and the panel-shaped light source section 20, which end faces are parallel with the XY plane and are other than the site provided with the optical intensity detecting section 27, are covered with the light absorbing members 28, 28. Therefore, the light radiated out from the end faces of the EL layer 22, which end faces are parallel with the XY plane, and the light radiated out from the end faces of the light transmissive electrode 21, which end faces are parallel with the XY plane, are absorbed by the light absorbing members 28, 28 and do not act as stray light. Accordingly, the reliability of the image information having been read out from the image recording medium 10 is capable of being enhanced. The light absorbing members may also be located so as to cover the end faces of the image recording medium 10 and the panel-shaped light source section 20, which end faces are parallel with the XZ plane. In such cases, the effect of preventing the occurrence of stray light is capable of being enhanced even further.

Figure 3:
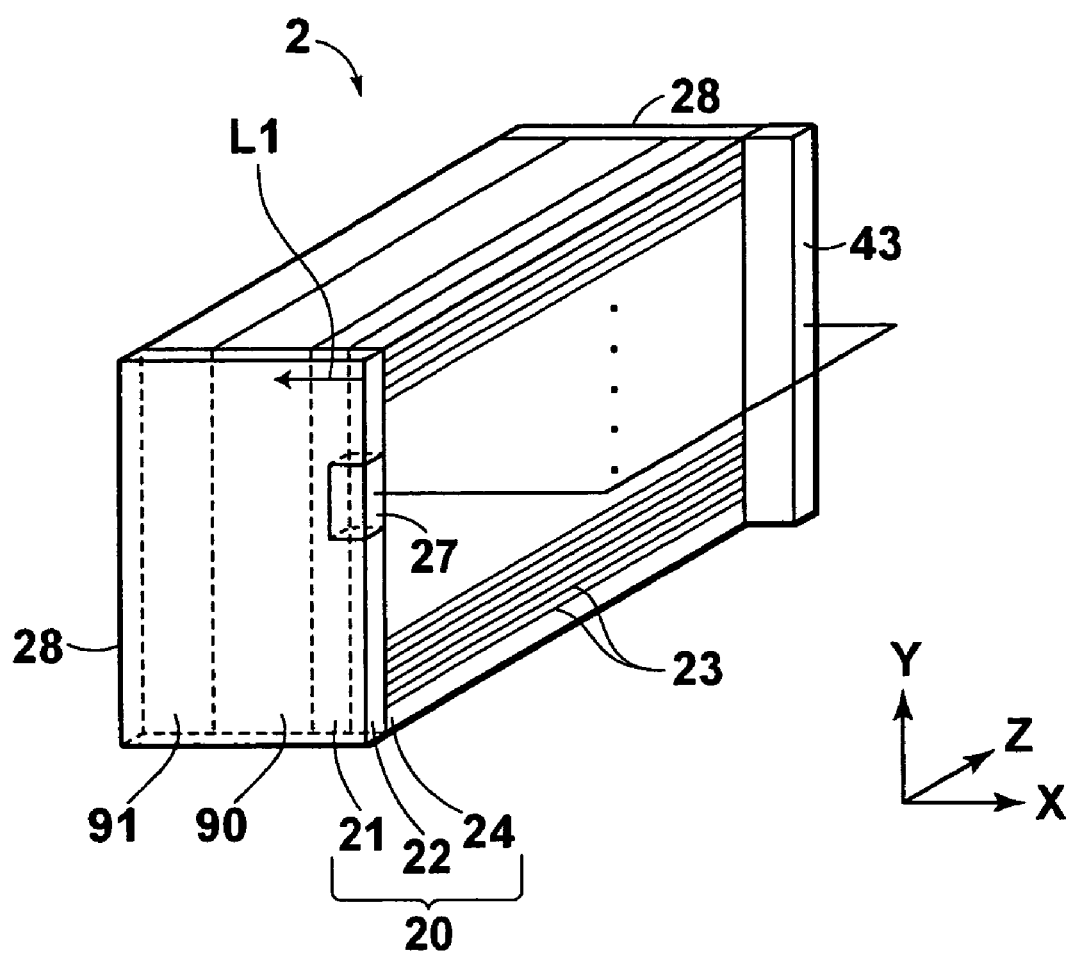
FIG. 3 is a schematic view showing an image information read-out system, in which a second embodiment of the image information read-out apparatus in accordance with the present invention is employed.

An image information read-out system, in which a second embodiment of the image information read-out apparatus in accordance with the present invention is employed, will be described herein below with reference to FIG. 3. The second embodiment of the image information read-out apparatus in accordance with the present invention is employed in an image information read-out system 2 for reading out an image from a stimulable phosphor sheet. In FIG. 3, similar elements are numbered with the same reference numerals with respect to FIG. 1.

With reference to FIG. 3, the image information read-out system 2 comprises the panel-shaped light source section 20 for performing the scanning exposure of a stimulable phosphor sheet 90, on which a radiation image has been stored, with the reading light beams L1, L1, . . . The image information read-out system 2 also comprises a scanning exposure control section 43. The image information read-out system 2 further comprises a photodetector 91 for detecting light, which is emitted by the stimulable phosphor sheet 90 when the stimulable phosphor sheet 90 is exposed to the reading light beams L1, L1, . . . The image information read-out system 2 still further comprises a signal processing section (not shown), which is connected to the photodetector 91.

The optical intensity detecting section 27 is located at one of the end areas of the EL layer 22 of the panel-shaped light source section 20, which end areas are opposite to each other with respect to the Z direction. The optical intensity detecting section 27 is located such that its light receiving section stands facing the end area of the EL layer 22. The optical intensity detecting section 27 converts the optical intensity of the received light into an electric signal and feeds the electric signal as the optical intensity signal D into the scanning exposure control section 43. The light receiving section of the optical intensity detecting section 27 has a size of 0.2 μm (in the X direction)×1 mm (in the Y direction). The optical intensity detecting section 27 is thus capable of detecting the optical intensities of the light beams, which are produced successively with actuation of ten linear electrodes 23, 23, . . . , with one detecting operation.

Entire areas of the end faces of the image recording medium 10 and the panel-shaped light source section 20, which end faces are parallel with the XY plane and are other than the site provided with the optical intensity detecting section 27, are covered with the light absorbing members 28, 28.

As in the cases of the scanning exposure control section 40 described above, at the time of each read-out scanning operation, the scanning exposure control section 43 compares the value of the optical intensity signal D, which has been detected by the optical intensity detecting section 27, and the reference optical intensity value, which has been stored previously, with each other. Also, as the cumulative period of actuation of the EL layer 22 becomes long, the scanning exposure control section 43 controls the electric current flowing across the EL layer 22 so as to compensate for the adverse effect of the lowering of the optical intensity of the light, which is produced by the EL layer 22. The scanning exposure control section 43 operates basically in the same manner as that for the scanning exposure control section 40 described above.

The photodetector 91 is located on the side of the stimulable phosphor sheet 90, which side is opposite to the side facing the panel-shaped light source section 20. The photodetector 91 comprises a plurality of photoelectric conversion devices, each of which detects the light, which is emitted from a corresponding site (i.e., a corresponding pixel) on the stimulable phosphor sheet 90. The photoelectric conversion devices may be constituted of amorphous silicon sensors, CCD sensors, MOS sensors, and the like. As illustrated in FIG. 3, the photodetector 91 may be formed as a planar two-dimensional sensor. Alternatively, the photodetector 91 may be formed as a one-dimensional sensor and may be moved in the manner interlocked with the scanning with the reading light beams L1, L1, . . .

How the image information read-out system 2 operates will be described herein below. In accordance with the control made by the scanning exposure control section 43, the line-like reading light beams L1, L1, . . . , which have been radiated out from the panel-shaped light source section 20 one after another, scan the stimulable phosphor sheet 90, on which the radiation image has been stored. When the stimulable phosphor sheet 90 is exposed to a reading light beam L1, the exposed site of the stimulable phosphor sheet 90 is caused by the reading light beam L1 to emit the light in proportion to the amount of energy stored on the stimulable phosphor sheet 90 during exposure of the stimulable phosphor sheet 90 to radiation. Part of the emitted light impinges upon the photodetector 91. The emitted light having impinged upon the photodetector 91 is amplified and photoelectrically converted by each of the photoelectric conversion devices. An image signal component, which represents the pixel corresponding to each of the photoelectric conversion devices, is fed out into the external signal processing section. As in the first embodiment described above, each of the reading light beams L1, L1, . . . has been compensated for the lowering of the optical intensity due to the alteration of the EL layer 22 with the passage of time.

In this embodiment, the EL layer 22 of the panel-shaped light source section 20 is constituted so as to produce the reading light beams L1, L1, . . . having wavelengths appropriate for causing the stimulable phosphor sheet 90 to emit the light.

With the second embodiment, as in the first embodiment described above, the problems are capable of being prevented from occurring in that, as the cumulative period of actuation of the EL layer 22 becomes long, the optical intensity of each of the reading light beams L1, L1, . . . alters. Accordingly, the reliability of the image information having been read out from the stimulable phosphor sheet 90 is capable of being enhanced. Further, since the optical intensity of the light, which is radiated out from the end face of the EL layer 22, is detected as the optical intensity of the light radiated out from the EL layer 22, the problems are capable of being prevented from occurring in that each of the reading light beams L1, L1, . . . is adversely affected by the operation for detecting the optical intensity of each of the reading light beams L1, L1, . . . Furthermore, with this embodiment, the entire areas of the end faces of the image recording medium 10 and the panel-shaped light source section 20, which end faces are parallel with the XY plane and are other than the site provided with the optical intensity detecting section 27, are covered with the light absorbing members 28, 28. Therefore, the occurrence of stray light is capable of being suppressed.

In each of the first and second embodiments described above, the optical intensity detecting section 27 is provided with the light receiving section having a size of 0.2 μm (in the X direction)×1 mm (in the Y direction) and is thus capable of detecting the optical intensities of the light beams, which are radiated out successively from the end face of the EL layer 22 with the actuation of ten linear electrodes 23, 23, . . . , with one detecting operation. Alternatively, for example, the optical intensity detecting section 27 may be replaced by an optical intensity detecting section capable of detecting the optical intensity of the light beam radiated out from the region of the EL layer 22, which region corresponds to one linear electrode 23, with one detecting operation. As another alternative, the optical intensity detecting section 27 may be replaced by an optical intensity detecting section capable of detecting the optical intensities of the light beams radiated out from the regions of the EL layer 22, which regions correspond to all of the 4,300 linear electrodes 23, 23, . . . , with one detecting operation.

Specifically, by way of example, the optical intensity detecting section 27 may be replaced by an optical intensity detecting section, which is provided with one light receiving section having a size of 100 μm×100 μm and is capable of detecting the optical intensity of the reading light beam radiated out from one line (i.e., the region of the EL layer 22 corresponding to one linear electrode 23) with one detecting operation. Also, for example, the optical intensity detecting section 27 may be replaced by an optical intensity detecting section, which is provided with 4,300 light receiving sections, each having a size of 100 μm×100 μm, and is capable of detecting the optical intensities of the reading light beams radiated out from the 4,300 lines (i.e., the regions of the EL layer 22 corresponding to the 4,300 linear electrodes 23, 23, . . . ) with successive detecting operations or with one detecting operation.

Further, in lieu of the optical intensity of the light, which is radiated out from the end face of the EL layer 22, being detected, the optical intensity of the light, which has been propagated through the light transmissive electrode 21, the transparent insulating layer 17, or the like, may be detected as the optical intensity of the light radiated out from the EL layer 22. The absolute intensity of the light impinging upon the optical intensity detecting section may vary in accordance with the number of the scanning lines or the position of the actuated line. Therefore, the optical intensity detecting section should preferably be provided with a signal processing circuit, which corrects the detected optical intensity signal D in accordance with the number of the scanning lines or the position of the actuated line and which feeds the corrected optical intensity signal D into the scanning exposure control section 40 or the scanning exposure control section 43.

In cases where the optical intensity detecting section is constituted so as to be capable of detecting each of the optical intensities of the reading light beams radiated out from all of the lines, the scanning exposure control section 40 or the scanning exposure control section 43 should preferably be constituted so as to be capable of controlling the electric power supplied to each of the linear electrodes 23, 23, . . . In such cases, the value of the electric power supplied to each of the linear electrodes 23, 23, . . . may be controlled such that the optical intensity of the reading light beam radiated out from each of the lines may become identical with the reference optical intensity value. In this manner, besides the suppression of the alteration of the optical intensity of the reading light beam, which alteration occurs as the cumulative period of actuation of the EL layer 22 becomes long, the variation of the optical intensities of the reading light beams radiated out from the lines is capable of being suppressed.

It may occur that, in cases where maximum electric power is supplied to a predetermined line, the optical intensity of the reading light beam, which is radiated out from the predetermined line, does not come up to the optical intensity, with which the image information is capable of being read out from the image recording medium 10 or the stimulable phosphor sheet 90 (for example, the light emission from the predetermined line does not occur, or the light emission from the predetermined line occurs only slightly). In such cases, the information with regard to the predetermined line should preferably be fed into the scanning exposure control section 40 or the scanning exposure control section 43, and the image information corresponding to the predetermined line should preferably be interpolated from the image information corresponding to the regions in the vicinity of the predetermined line. Also, it may occur that the optical intensity of the reading light beam, which is radiated out from the predetermined line, comes up to the optical intensity, with which the image information is capable of being read out from the image recording medium 10 or the stimulable phosphor sheet 90, but does not come up to the reference optical intensity value. In such cases, the information with regard to the predetermined line should preferably be fed into the scanning exposure control section 40 or the scanning exposure control section 43, and the image processing performed on the image information corresponding to the predetermined line should preferably be altered.

Figure 4:
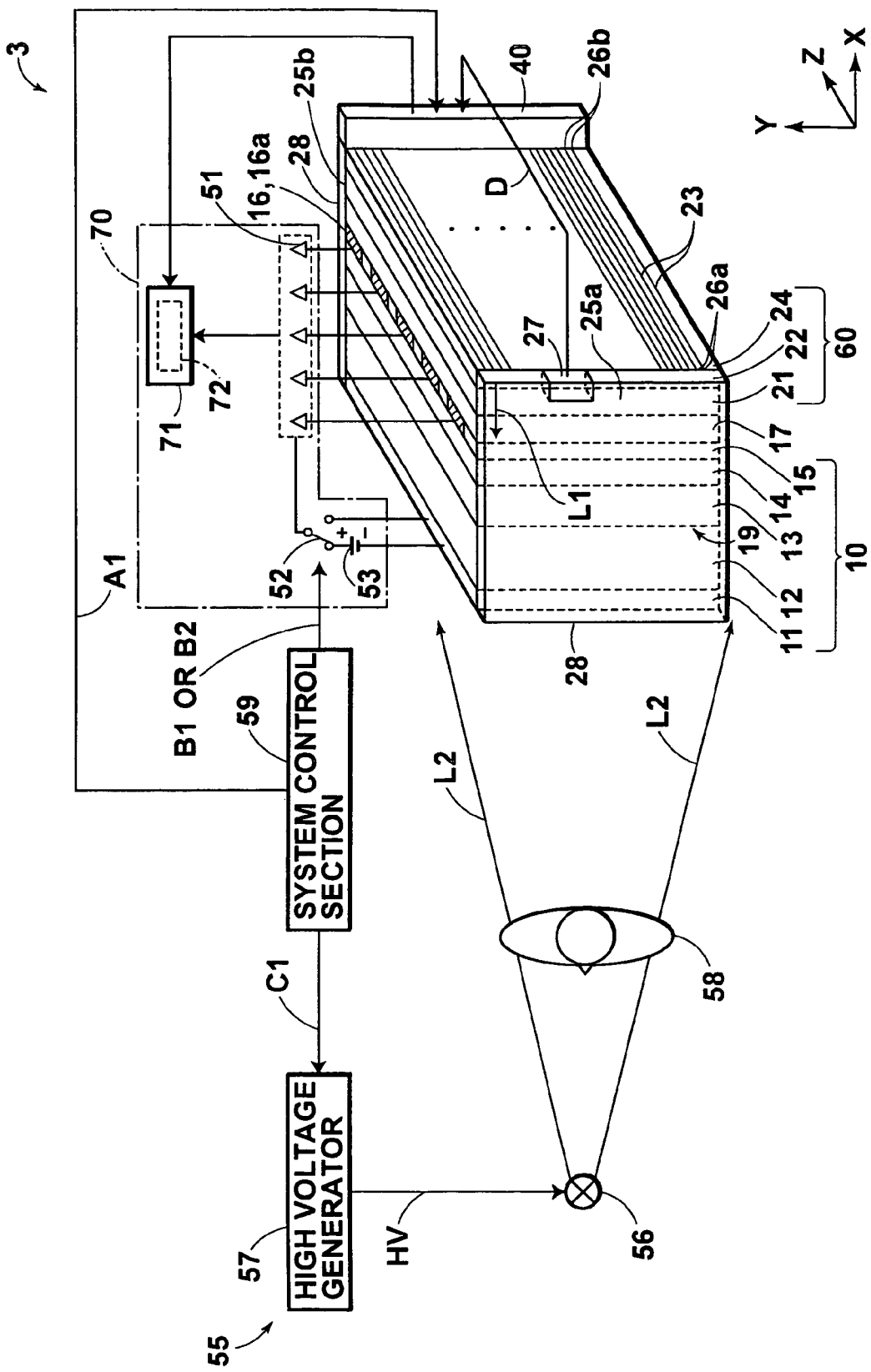
FIG. 4 is a schematic view showing an image information recording and read-out system, in which a third embodiment of the image information read-out apparatus in accordance with the present invention is employed.

An image information recording and read-out system, in which a third embodiment of the image information read-out apparatus in accordance with the present invention is employed, will be described herein below with reference to FIG. 4. FIG. 4 is a schematic view showing an image information recording and read-out system 3, in which a third embodiment of the image information read-out apparatus in accordance with the present invention is employed. In FIG. 4, similar elements are numbered with the same reference numerals with respect to FIG. 1.

With reference to FIG. 4, the image information recording and read-out system 3 comprises the image recording medium 10. The image information recording and read-out system 3 also comprises a panel-shaped light source section 60, which performs the scanning exposure of the image recording medium 10 with the reading light beams L1, L1, . . . The image information recording and read-out system 3 further comprises the scanning exposure control section 40, which controls the operation of the panel-shaped light source section 60. The image information recording and read-out system 3 still further comprises a reading section 70, which reads the image information from the image recording medium 10. The image information recording and read-out system 3 also comprises the radiation irradiating section 55, which irradiates the radiation L2 acting as the recording light toward the image recording medium 10. The image information recording and read-out system 3 further comprises the system control section 59, which is connected to the scanning exposure control section 40, the reading section 70, and the radiation irradiating section 55.

The panel-shaped light source section 60 comprises the planar light transmissive electrode 21, which is constituted of an ITO film. The panel-shaped light source section 60 also comprises the EL layer 22. The panel-shaped light source section 60 further comprises the linear electrode layer 24 provided with the 4,300 linear electrodes 23, 23, . . . , which are arrayed in parallel and extend in the Z direction.

Before the panel-shaped light source section 60 is incorporated in the image information recording and read-out system 3, or after the panel-shaped light source section 60 has been incorporated in the image information recording and read-out system 3, the panel-shaped light source section 60 is subjected to an aging operation for a period of at least 24 hours. At the time of the aging operation, the electric power necessary for the EL layer 22 to radiate out the reading light beam L1 is supplied to each of the linear electrodes 23, 23, . . . Ordinarily, within several hours after the beginning of the supply of the electric power to each of the linear electrodes 23, 23, . . . , the optical intensity of the light radiated out from the EL layer 22 becomes low by approximately 10% to approximately 20%. Thereafter, the optical intensity of the light radiated out from the EL layer 22 becomes low little by little. Therefore, after the panel-shaped light source section 60 has been subjected to the aging operation for a period of at least 24 hours, the rate of lowering of the optical intensity of the light radiated out from the EL layer 22, which lowering occurs as the cumulative period of actuation of the EL layer 22 becomes long, is markedly low.

Also, the optical intensity detecting section 27 is located at one of the end areas of the EL layer 22, which end areas are opposite to each other with respect to the Z direction. The optical intensity detecting section 27 is located such that its light receiving section stands facing the end area of the EL layer 22, which end area corresponds to the end areas 26a, 26a, . . . of ten linear electrodes 23, 23, . . . The optical intensity detecting section 27 converts the optical intensity of the received light into an electric signal and feeds the electric signal as the optical intensity signal D into the scanning exposure control section 40.

Further, the entire areas of the end faces of the image recording medium 10 and the panel-shaped light source section 60, which end faces are parallel with the XY plane and are other than the site provided with the optical intensity detecting section 27, are covered with the light absorbing members 28, 28.

The reading section 70 comprises the plurality of the current detection amplifiers 51, 51, . . ., which are connected to the inversion input terminals. Each of the current detection amplifiers 51, 51, . . . is provided for one of the elements 16a, 16a, . . . of the striped electrode 16. The first electrode layer 11 of the image recording medium 10 is connected to one of the input terminals of the switch 52 and to the negative pole of the electric power source 53. The positive pole of the electric power source 53 is connected to the other input terminal of the switch 52. The output terminal of the switch 52 is connected commonly to each of the non-inversion input terminals of the operational amplifiers (not shown), each of which constitutes one of the current detection amplifiers 51, 51, . . .

Also, the reading section 70 comprises a signal processing section 71, which is provided with a memory 72 for storing acquired image correction data. After the aging operation described above has been performed, the radiation L2 having uniform intensity distribution is irradiated to the image recording medium 10. Thereafter, the read-out scanning operation is performed on the image recording medium 10, on which the image information has thus been recorded, and the recorded image information is read out from the image recording medium 10. The thus acquired image information constitutes the data containing an image variation of offset values, gains, and the like, at respective pixels in the image information. Predetermined operation processing is performed on the data, and correction data is thereby formed. The thus formed correction data is stored as the image correction data in the memory 72.

At the time of the read-out scanning operation, each of the reading light beams L1, L1, . . . is irradiated toward the striped electrode 16 for the scanning exposure, and each of the current detection amplifiers 51, 51, . . . detects the electric current flowing across the corresponding one of the elements 16a, 16a, . . . The current detection amplifiers 51, 51, . . . thus detects the electric currents simultaneously (i.e., in a parallel manner) with respect to the elements 16a, 16a, . . . The results of the detection are outputted into the signal processing section 71. The signal processing section 71 successively receives exposed site information, which represents the site exposed to each of the reading light beams L1, L1, . . . , from the scanning exposure control section 40. Also, the signal processing section 71 stores the detection results, which have been received from the current detection amplifiers 51, 51, . . ., and the corresponding exposed site information as the image information. After the read-out scanning operation has been finished, the signal processing section 71 corrects the image information in accordance with the image correction data, which has been stored in the memory 72. The signal processing section 71 thus forms a display image signal, which represents one image.

The image information recording and read-out system 3 operates basically in the same manner as that for the image information recording and read-out system 1, except that the image correction data is utilized at the time of the formation of the display image signal.

As described above, in the third embodiment, the panel-shaped light source section 60, which has been subjected to the aging operation for a period of at least 24 hours, is utilized. Therefore, in cases where the cumulative period of actuation of the EL layer 22 becomes long, the optical intensities of the reading light beams L1, L1, . . . are capable of being kept approximately at a predetermined value. Also, the image correction data is acquired after the optical intensities of the reading light beams L1, L1, . . . , which are radiated out from the panel-shaped light source section 60 having been subjected to the aging operation, have become approximately equal to the predetermined value due to the aging operation. Therefore, errors in image correction data at the time of the image correction are capable of being suppressed, and the image correction is capable of being made accurately. Further, since the alteration of the optical intensities, which alteration occurs as the cumulative period of actuation of the EL layer 22 becomes long, is small, the time interval between the acquisition of the image correction data and the next acquisition of the image correction data is capable of being kept long. Furthermore, since the optical intensities of the reading light beams L1, L1, . . . are detected, and the feedback control is performed for controlling the amount of the electric current flowing across the EL layer 22 as in the first embodiment described above, the alteration of the optical intensities, which alteration occurs as the cumulative period of actuation of the EL layer 22 becomes long, is capable of being suppressed even further. Also, since the image correction data is acquired previously, and the image information is formed by use of the image correction data, the image information having a high reliability is capable of being formed.

Alternatively, for example, the image recording medium 10, which has not been exposed to the radiation L2, may be subjected to the read-out scanning operation for reading out the image information from the image recording medium 10. In this manner, an image signal, which reflects offset values at respective pixels in the image information, may be acquired. The thus acquired image signal may then be subjected to predetermined operation processing, and offset correction data may thereby be formed. The offset correction data may be stored as the image correction data and utilized at the time of the formation of the image information.

In cases where the alteration of the optical intensities of the reading light beams L1, L1, . . . , which alteration occurs as the cumulative period of actuation of the EL layer 22 becomes long, is suppressed sufficiently with the aging operation performed on the panel-shaped light source section 60, the feedback control for the reading light beams L1, L1, . . . need not necessarily be performed. In such cases, the image information recording and read-out system 3 is capable of being simplified.

Figure 5:
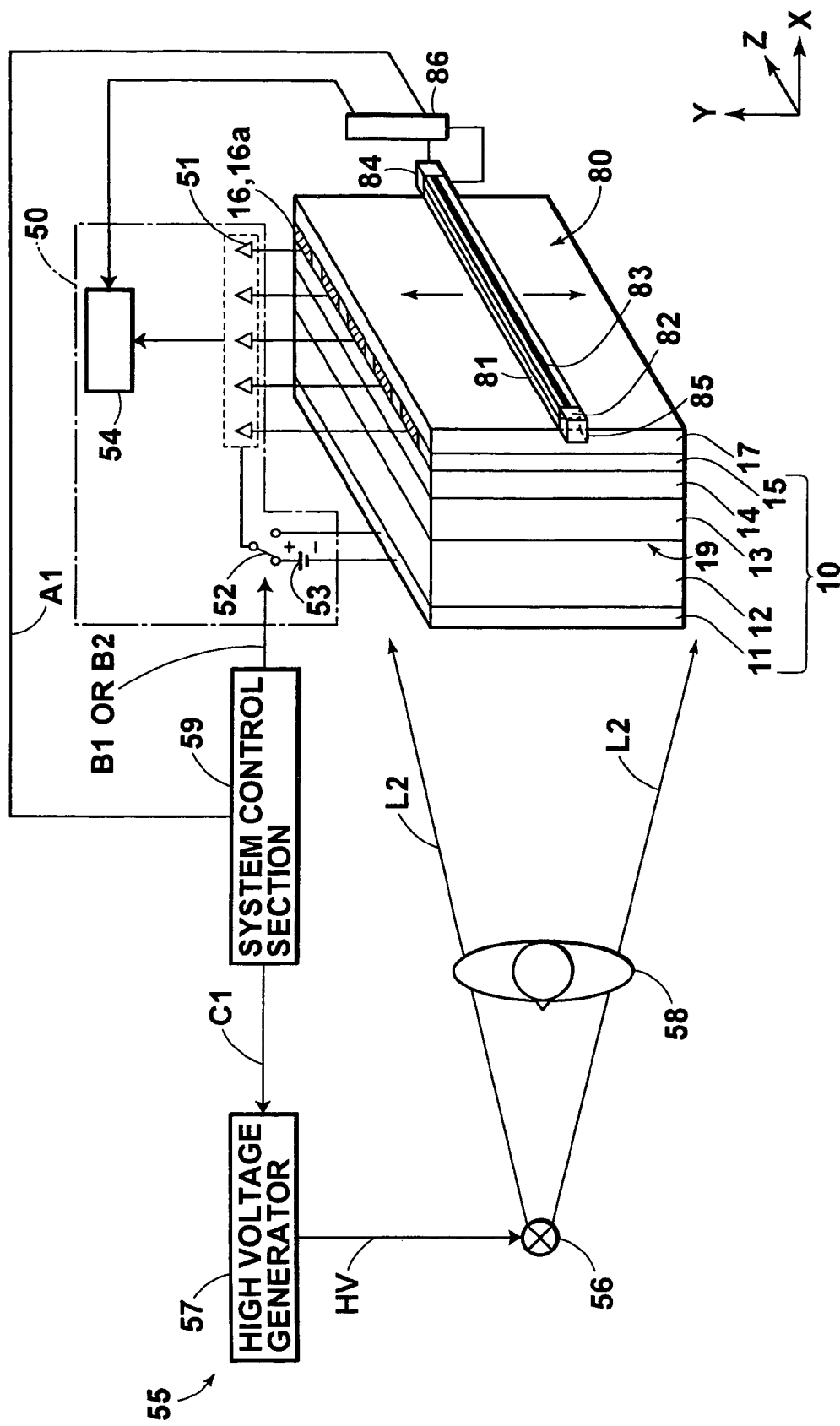
FIG. 5 is a schematic view showing an image information recording and read-out system, in which a fourth embodiment of the image information read-out apparatus in accordance with the present invention is employed.

An image information recording and read-out system, in which a fourth embodiment of the image information read-out apparatus in accordance with the present invention is employed, will be described herein below with reference to FIG. 5. FIG. 5 is a schematic view showing an image information recording and read-out system 4, in which a fourth embodiment of the image information read-out apparatus in accordance with the present invention is employed. In FIG. 5, similar elements are numbered with the same reference numerals with respect to FIG. 1.

With reference to FIG. 5, the image information recording and read-out system 4 comprises the image recording medium 10. The image information recording and read-out system 4 also comprises the panel-shaped light source section 20, which performs the scanning exposure of the image recording medium 10 with the reading light beams L1, L1, . . .

The image information recording and read-out system 4 further comprises a scanning exposure control section 62, which controls the operation of the panel-shaped light source section 20. The image information recording and read-out system 4 still further comprises the reading section 50, which reads the image information from the image recording medium 10. The image information recording and read-out system 4 also comprises the radiation irradiating section 55, which irradiates the radiation L2 acting as the recording light toward the image recording medium 10. The image information recording and read-out system 4 further comprises the system control section 59, which is connected to the scanning exposure control section 62, the reading section 50, and the radiation irradiating section 55. The panel-shaped light source section 20 comprises the light transmissive electrode 21, the EL layer 22, and the linear electrode layer 24. The image information recording and read-out system 4 is not provided with the optical intensity detecting section 27 illustrated in FIG. 1.

In cases where the control signal A1 for instructing the read-out scanning operation is fed from the system control section 59 into the scanning exposure control section 62, the scanning exposure control section 62 operates in the manner described below. Specifically, the electric power is supplied to the end areas 26b, 26b, . . . of the linear electrodes 23, 23, . . . one after another. The electric currents are successively caused to flow across the regions of the EL layer 22, each of which regions is located between one of the linear electrodes 23, 23, . . . and the light transmissive electrode 21. The reading light beams L1, L1, . . . are thus successively radiated out with different timing from the panel-shaped light source section 20.

Also, the scanning exposure control section 62 is provided with a cumulative actuation period storing section 63 and a storage section 64. The cumulative actuation period storing section 63 stores the information representing the cumulative period of actuation of the EL layer 22 of the panel-shaped light source section 20. The storage section 64 previously stores the information representing a relationship between a cumulative period of actuation of an equivalent EL layer, which is equivalent to the EL layer 22, and the electric power, which is to be supplied across the equivalent EL layer such that the light having a predetermined optical intensity having been set previously is radiated out from the equivalent EL layer. FIG. 6 is a graph showing the relationship between the cumulative period of actuation of an EL layer and the electric power supplied across the EL layer. Ordinarily, in cases where predetermined electric power is supplied across the EL layer 22, within several hours after the beginning of the supply of the electric power, the optical intensity of the light radiated out from the EL layer 22 becomes low by approximately 10% to approximately 20%. Thereafter, the optical intensity of the light radiated out from the EL layer 22 becomes low little by little. The characteristics described above are referred to as the aging characteristics. The aging characteristics vary slightly for different EL layers. Therefore, the aging characteristics of the equivalent EL layer, which is equivalent to the EL layer 22 used, are measured previously, and the electric power supplied across the EL layer 22 is set to be high such that the aging characteristics may be compensated for. In such cases, in cases where the cumulative period of actuation of the EL layer 22 becomes long, the light having the predetermined optical intensity is capable of being radiated out from the EL layer 22.

For each read-out scanning operation, the scanning exposure control section 62 controls the electric power, which is supplied across the EL layer 22, such that the light having the predetermined optical intensity having been set previously may be radiated out from the EL layer 22. The control is made in accordance with the cumulative period of actuation of the EL layer 22, which cumulative period of actuation has been stored in the cumulative actuation period storing section 63, and the relationship between the cumulative period of actuation of the equivalent EL layer and the electric power, which is to be supplied across the equivalent EL layer such that the light having the predetermined optical intensity having been set previously is radiated out from the equivalent EL layer, the relationship having been stored in the storage section 64.

In the fourth embodiment, as the cumulative period of actuation of the EL layer 22 becomes long, the electric current flowing across the EL layer 22 is successively set to be high, such that the lowering of the optical intensity of the light radiated out from the EL layer 22 may be compensated for. Therefore, regardless of the cumulative period of actuation of the EL layer 22, the light having approximately predetermined optical intensity is capable of being radiated out from the EL layer 22.

The operations of the image information recording and read-out system 4 are basically identical with the operations of the image information recording and read-out system 1 described above, except for the technique for controlling the optical intensity of each of the reading light beams L1, L1, . . .

As described above, with the fourth embodiment, as in the first embodiment described above, the problems are capable of being prevented from occurring in that, as the cumulative period of actuation of the EL layer 22 becomes long, the optical intensity of each of the reading light beams L1, L1, . . . alters. Accordingly, the reliability of the image information having been read out from the image recording medium 10 is capable of being enhanced. Also, the optical intensity detecting section 27 illustrated in FIG. 1 need not be provided, and the production cost of the apparatus is capable of being kept low.

An image information recording and read-out system, in which a fifth embodiment of the image information read-out apparatus in accordance with the present invention is employed, will be described herein below with reference to FIG. 7. FIG. 7 is a schematic view showing an image information recording and read-out system 5, in which a fifth embodiment of the image information read-out apparatus in accordance with the present invention is employed. In FIG. 7, similar elements are numbered with the same reference numerals with respect to FIG. 1.

With reference to FIG. 7, the image information recording and read-out system 5 comprises the image recording medium 10. The image information recording and read-out system 5 also comprises the panel-shaped light source section 20, which performs the scanning exposure of the image recording medium 10 with the reading light beams L1, L1, . . . The image information recording and read-out system 5 further comprises a scanning exposure control section 73, which controls the operation of the panel-shaped light source section 20. The image information recording and read-out systems still further comprises a reading section 74, which reads the image information from the image recording medium 10. The image information recording and read-out system 5 also comprises the radiation irradiating section 55, which irradiates the radiation L2 acting as the recording light toward the image recording medium 10. The image information recording and read-out system 5 further comprises the system control section 59, which is connected to the scanning exposure control section 73, the reading section 74, and the radiation irradiating section 55. The panel-shaped light source section 20 comprises the light transmissive electrode 21, the EL layer 22, and the linear electrode layer 24. The image information recording and read-out system 5 is not provided with the optical intensity detecting section 27 illustrated in FIG. 1.

In cases where the control signal A1 for instructing the read-out scanning operation is fed from the system control section 59 into the scanning exposure control section 73, the scanning exposure control section 73 operates in the manner described below. Specifically, the electric power is supplied to the end areas 26b, 26b, . . . of the linear electrodes 23, 23, . . . one after another. The electric currents are successively caused to flow across the regions of the EL layer 22, each of which regions is located between one of the linear electrodes 23, 23, . . . and the light transmissive electrode 21. The reading light beams L1, L1, . . . are thus successively radiated out with different timing from the panel-shaped light source section 20.

The reading section 74 comprises the plurality of the current detection amplifiers 51, 51, . . . The results of the detection made by the current detection amplifiers 51, 51, . . . are outputted into the signal processing section 75. The signal processing section 75 successively receives exposed site information, which represents the site exposed to each of the reading light beams L1, L1, . . . , from the scanning exposure control section 73. Also, the signal processing section 75 stores the detection results, which have been received from the current detection amplifiers 51, 51, and the corresponding exposed site information. After the read-out scanning operation has been finished, the signal processing section 54 forms an image signal, which represents one image, in accordance with the detection results and the exposed site information.

Also, the reading section 74 is provided with a cumulative actuation period storing section 76 and a storage section 77. The cumulative actuation period storing section 76 stores the information representing the cumulative period of actuation of the EL layer 22 of the panel-shaped light source section 20. The storage section 77 previously stores the information representing a relationship between a cumulative period of actuation of an equivalent EL layer, which is equivalent to the EL layer 22, and an optical intensity of light, which is radiated out from the equivalent EL layer in cases where electric power having been set is supplied across the equivalent EL layer, i.e. the information representing the aging characteristics of the equivalent EL layer. FIG. 8 is a graph showing aging characteristics of an EL layer. The reading section 74 is also provided with a correction data forming section 78 for forming image correction data in accordance with the cumulative period of actuation of the EL layer 22, which cumulative period of actuation has been measured and stored in the cumulative actuation period storing section 76, and the aging characteristics of the equivalent EL layer, which aging characteristics have been stored in the storage section 77. The reading section 74 is further provided with an image information correcting section 79 for correcting the image information, which has been read out from the image recording medium 10, in accordance with the image correction data. The aging characteristics of the equivalent EL layer, which is equivalent to the EL layer 22 used, are measured previously, and the information representing the aging characteristics is stored in the storage section 77.

For each read-out scanning operation, as the image correction data, the correction data forming section 78 calculates a ratio F of the optical intensity of the light, which is radiated out from the EL layer 22 in cases where the cumulative period of actuation of the EL layer 22 is zero, to the optical intensity of the light, which is radiated out from the EL layer 22 at the time of the read-out operation. The ratio F is calculated from the cumulative period of actuation of the EL layer 22, which cumulative period of actuation has been stored in the cumulative actuation period storing section 76, and the aging characteristics of the equivalent EL layer, which aging characteristics have been stored in the storage section 77. Also, the image information correcting section 79 multiplies each of pixel values of the image information, which has been read out from the image recording medium 10, by the ratio F. In this manner, the image information correcting section 79 forms the corrected image information. Specifically, in the fifth embodiment, the pixel values of the image information, which has been read out from the image recording medium 10, are corrected, such that the lowering of the optical intensity of the light radiated out from the EL layer 22, which lowering occurs as the cumulative period of actuation of the EL layer 22 becomes long, may be compensated for.

The operations of the image information recording and read-out system 5 are basically identical with the operations of the image information recording and read-out system 1 described above, except that the feedback control for the reading light beams L1, L1, . . . is not performed, and except that the correction of the image information is performed.

As described above, with the fifth embodiment, the image information, which has been read out from the image recording medium 10, are corrected in accordance with the cumulative period of actuation of the EL layer 22 and the aging characteristics of the equivalent EL layer. Therefore, the reliability of the image information having been read out from the image recording medium 10 is capable of being kept high in cases where, as the cumulative period of actuation of the EL layer 22 becomes long, the optical intensity of the line light beam radiated out from the EL layer 22 becomes low.

In the fifth embodiment, the ratio F described above is employed as the image correction data. Alternatively, for example, information representing a graph, in which a corrected pixel value is defined in accordance with the level of the pixel value of the image information, may be employed as the image correction data. As another alternative, information representing a mathematical formula, with which a corrected pixel value is capable of being calculated from substitution of a pixel value, may be employed as the image correction data.

In each of the first to fifth embodiments described above, the panel-shaped light source section 20 or the panel-shaped light source section 60, which is provided with the plurality of the linear electrodes 23, 23, . . . , is employed. Alternatively, a linear light source section, which is capable of being moved mechanically, may be employed. For example, as illustrated in FIG. 9, a line light source device 80 may be employed. The line light source device 80 comprises a light transmissive electrode 81, which has a thickness of 0.1 μm and a size of 430 mm (in the Z direction)×7.35 mm (in the Y direction) The line light source device 80 also comprises an EL layer 82, which has a thickness of 0.1 μm and a size of 430 mm (in the Z direction)×7.35 mm (in the Y direction). The line light source device 80 further comprises a linear electrode 83, which is constituted of an aluminum electrode having a length of 430 mm, a width of 50 μm, and a thickness of 0.1 μm. The line light source device 80 is capable of being moved in the Y direction by mechanical scanning means (not shown), and the image recording medium 10 is capable of being scanned with the reading light beam L1, which is radiated out from the line light source device 80. In such cases, an optical intensity detecting section 84 acting also as the light absorbing member may be located at one of the end faces of the line light source device 80, which end faces are opposite to each other with respect to the Z direction. Also, a light absorbing member 85 may be located at the other end face of the line light source device 80.

Further, for example, before the read-out scanning operation is performed, the line light source device 80 may be located at a position, at which the reading light beam L1 radiated out from the line light source device 80 does not impinge upon the image recording medium 10, and the predetermined electric power may be supplied to the linear electrode 83. The optical intensity of the reading light beam L1, which is thus radiated out from the EL layer 82, may be detected. Furthermore, with a scanning exposure control section 86, the thus detected optical intensity and the reference optical intensity value, which has been stored previously, may be compared with each other, and the amount of the supplied electric power may be controlled in accordance with the result of the comparison. In such cases, the exposure scanning operation is capable of being performed with the reading light beam L1, which has the optical intensity approximately identical with the reference optical intensity value.

In each of the embodiments described above, the organic EL layer is employed as the EL layer 22 or the EL layer 82. Alternatively, an inorganic EL layer may be employed as the EL layer 22 or the EL layer 82. In such cases, since the inorganic EL layer is actuated by an alternating current, the control of the optical intensity of the reading light beam L1 is performed through the control of an act. Voltage.

In the first and third embodiments described above, the transparent insulating layer 17 is located between the image recording medium 10 and the panel-shaped light source section 20 or the panel-shaped light source section 60. Alternatively, as illustrated in FIG. 10, in lieu of the insulating layer 17, an insulating layer 30 may be employed. The insulating layer 30 comprises two insulating layers 31, 32, and a transparent electrical conductor layer 33 located between the two insulating layers 31, 32. The electrical conductor layer 33 is constituted of an ITO film, an IZO (indium zinc oxide), or the like, and is grounded. The electrical conductor layer 33 acts as an electrical shielding layer. Therefore, in such cases, the problems are capable of being prevented from occurring in that noise occurring at the panel-shaped light source section 20 or the panel-shaped light source section 60 adversely affects the image recording medium 10.

Each of the third, fourth, and fifth embodiments described above is also applicable to the image information read-out system, in which the image is read out from the stimulable phosphor sheet.

What is claimed is:

1. A line light irradiating method, comprising the steps of:
   i) locating an electroluminescent layer between a linear electrode and an opposite electrode, which stands facing the linear electrode, either one of the linear electrode and the opposite electrode being constituted of a light transmissive electrode,
   ii) supplying electric power across the electroluminescent layer, which is located between the linear electrode and the opposite electrode, via the linear electrode and the opposite electrode,
   iii) detecting an optical intensity of light radiated out from the electroluminescent layer, across which the electric power has been supplied, and
   iv) controlling the electric power, which is supplied across the electroluminescent layer, such that the thus detected optical intensity and a predetermined optical intensity, which has been set previously, become approximately identical with each other;
   wherein the detecting an optical intensity comprises correcting the detected optical intensity in accordance with either of a total number electrodes or a position of the linear electrode and opposite electrode.

2. A line light irradiating method as defined in claim 1 wherein an optical intensity of light, which is radiated out from an end face of the electroluminescent layer, is detected as the optical intensity of the light radiated out from the electroluminescent layer.

3. A line light irradiating method as defined in claim 1 wherein an end face of the electroluminescent layer is covered with a light absorbing member.

4. A line light source device, comprising:
   i) a light source section provided with:
      a) a linear electrode,
      b) an opposite electrode, which stands facing the linear electrode, and
      c) an electroluminescent layer, which is located between the linear electrode and the opposite electrode,
   either one of the linear electrode and the opposite electrode being constituted of a light transmissive electrode, and
   ii) electric power supplying means for supplying electric power across the electroluminescent layer, which is located between the linear electrode and the opposite electrode, via the linear electrode and the opposite electrode,
   wherein the line light source device further comprises optical intensity detecting means for detecting an optical intensity of light radiated out from the electroluminescent layer, across which the electric power has been supplied,
   the electric power supplying means controls the electric power, which is supplied across the electroluminescent layer, such that the optical intensity, which has been detected by the optical intensity detecting means, and a predetermined optical intensity, which has been set previously, become approximately identical with each other, and
   wherein the optical intensity detecting means comprises a signal processing circuit which corrects the detected optical intensity in accordance with either of a total number electrodes or a position of the linear electrode and opposite electrode.

5. A line light source device as defined in claim 4 wherein the optical intensity detecting means detects an optical intensity of light, which is radiated out from an end face of the electroluminescent layer, as the optical intensity of the light radiated out from the electroluminescent layer.

6. A line light source device as defined in claim 4 wherein an end face of the electroluminescent layer is covered with a light absorbing member.

7. An image information read-out method, comprising the steps of:
   i) obtaining an image recording medium, on which image information has been recorded previously, and
   ii) performing a scanning exposure operation for scanning the image recording medium with reading light, which has been radiated out from a line light source device, at the time of readout of the image information from the image recording medium,
   wherein the line light source device comprises:
      1) a light source section provided with:
         a) a linear electrode,
         b) an opposite electrode, which stands facing the linear electrode, and
         c) an electroluminescent layer, which is located between the linear electrode and the opposite electrode, either one of the linear electrode and the opposite electrode being constituted of a light transmissive electrode, 2) electric power supplying means for supplying electric power across the electroluminescent layer, which is located between the linear electrode and the opposite electrode, via the linear electrode and the opposite electrode, and 3) optical intensity detecting means for detecting an optical intensity of light radiated out from the electroluminescent layer, across which the electric power has been supplied, the electric power supplying means controlling the electric power, which is supplied across the electroluminescent layer, such that the optical intensity, which has been detected by the optical intensity detecting means, and a predetermined optical intensity, which has been set previously, become approximately identical with each other; and wherein the detecting an optical intensity comprises correcting the detected optical intensity in accordance with either of a total number electrodes or a position of the linear electrode and opposite electrode.

8. An image information read-out method as defined in claim 7 wherein the optical intensity detecting means detects an optical intensity of light, which is radiated out from an end face of the electroluminescent layer, as the optical intensity of the light radiated out from the electroluminescent layer.

9. An image information read-out method as defined in claim 7 wherein the line light source device is subjected to an aging operation before being used for the readout of the image information from the image recording medium, image correction data is acquired after the optical intensity of the reading light, which is radiated out from the line light source device having been subjected to the aging operation, has become approximately equal to a predetermined value due to the aging operation, and the image information, which has been read out from the image recording medium, is corrected in accordance with the thus acquired image correction data.

10. An image information read-out method as defined in claim 7 wherein the image recording medium is an electrostatic recording material, which is capable of recording the image information as an electrostatic latent image, and which is capable of generating electric currents in accordance with the recorded electrostatic latent image when being scanned with the reading light.

11. An image information read-out method as defined in claim 7 wherein the image recording medium is a stimulable phosphor sheet, which is capable of storing the image information, and which is capable of emitting light in accordance with the stored image information when being scanned with the reading light.

12. An image information read-out apparatus, comprising:

i) an image recording medium, on which image information has been recorded previously, ii) a line light source device for radiating out reading light toward the image recording medium, and iii) scanning exposure control section for performing a scanning exposure operation for scanning the image recording medium with the reading light, which has been radiated out from the line light source device, at the time of readout of the image information from the image recording medium, wherein the line light source device comprises:

1) a light source section provided with:

a) a linear electrode, b) an opposite electrode, which stands facing the linear electrode, and c) an electroluminescent layer, which is located between the linear electrode and the opposite electrode, either one of the linear electrode and the opposite electrode being constituted of a light transmissive electrode, 2) electric power supplying means for supplying electric power across the electroluminescent layer, which is located between the linear electrode and the opposite electrode, via the linear electrode and the opposite electrode, and 3) optical intensity detecting means for detecting an optical intensity of light radiated out from the electroluminescent layer, across which the electric power has been supplied, the electric power supplying means controlling the electric power, which is supplied across the electroluminescent layer, such that the optical intensity, which has been detected by the optical intensity detecting means, and a predetermined optical intensity, which has been set previously, become approximately identical with each other; and wherein the optical intensity detecting means comprises a signal processing circuit which corrects the detected optical intensity in accordance with either of a total number electrodes or a position of the linear electrode and opposite electrode.

13. An image information read-out apparatus as defined in claim 12 wherein the optical intensity detecting means detects an optical intensity of light, which is radiated out from an end face of the electroluminescent layer, as the optical intensity of the light radiated out from the electroluminescent layer.

14. An image information read-out apparatus as defined in claim 12 wherein the apparatus further comprises image information correcting means for correcting the image information, which has been read out from the image recording medium, the line light source device is subjected to an aging operation before being used for the readout of the image information from the image recording medium, image correction data is acquired after the optical intensity of the reading light, which is radiated out from the line light source device having been subjected to the aging operation, has become approximately equal to a predetermined value due to the aging operation, and the image information correcting means corrects the image information, which has been read out from the image recording medium, in accordance with the thus acquired image correction data.

15. An image information read-out apparatus as defined in claim 12 wherein the image recording medium is an electrostatic recording material, which is capable of recording the image information as an electrostatic latent image, and which is capable of generating electric currents in accordance with the recorded electrostatic latent image when being scanned with the reading light.

16. An image information read-out apparatus as defined in claim 12 wherein the image recording medium is a stimulable phosphor sheet, which is capable of storing the image information, and which is capable of emitting light in accordance with the stored image information when being scanned with the reading light.

17. A line light irradiating method, comprising the steps of:

i) locating an electroluminescent layer between a linear electrode and an opposite electrode, which stands facing the linear electrode, either one of the linear electrode and the opposite electrode being constituted of a light transmissive electrode, ii) supplying electric power across the electroluminescent layer, which is located between the linear electrode and the opposite electrode, via the linear electrode and the opposite electrode, iii) detecting an optical intensity of light radiated out from the electroluminescent layer, across which the electric power has been supplied, and iv) controlling the electric power, which is supplied across the electroluminescent layer, such that the thus detected optical intensity and a predetermined optical intensity, which has been set previously, become approximately identical with each other;

wherein the controlling the electric power comprises comparing a corrected detected optical intensity to the predetermined optical intensity after correction of the detected optical intensity.

18. An image information read-out method, comprising the steps of:

i) obtaining an image recording medium, on which image information has been recorded previously, and ii) performing a scanning exposure operation for scanning the image recording medium with reading light, which has been radiated out from a line light source device, at the time of readout of the image information from the image recording medium, wherein the line light source device comprises:

1) a light source section comprises:
    a) linear electrodes,
    b) an opposite electrode, which stands facing the linear electrodes, and
    c) an electroluminescent layer, which is located between the linear electrodes and the opposite electrode,
    wherein either the linear electrodes comprise light transmissive electrodes or the opposite electrode comprises a light transmissive electrode, 2) electric power supplying means for supplying a plurality of values of electric power in succession across the electroluminescent layer, which is located between the linear electrodes and the opposite electrode, via each of the linear electrode and the opposite electrode, and 3) optical intensity detecting means for detecting each of a plurality of optical intensities of light radiated out from the electroluminescent layer, across which the electric power has been supplied in succession, wherein the electric power supplying means controlling each of a plurality of values of the electric power, which is supplied across the electroluminescent layer in succession, such that the each of the plurality of optical intensities, which has been set previously, become approximately identical with each other; and wherein if a maximum electric power is supplied across the electroluminescent layer and the detected optical intensity corresponding to one of the linear electrodes is not sufficient to read out the image information, then the image information corresponding to the linear electrode is corrected by interpolation with image information corresponding to electrodes surrounding the linear electrode.

19. An image information read-out apparatus, comprising:

i) an image recording medium, on which image information has been recorded previously, ii) a line light source device for radiating out reading light toward the image recording medium, and iii) scanning exposure control section for performing a scanning exposure operation for scanning the image recording medium wirth the reading light, which has been radiated out from the line light source device, at the time of readout of the image information from the image recording medium, wherein the line light source device comprises:

1) a light source section comprising:
    a) linear electrodes
    b) an opposite electrode, which stands facing the linear electrodes, and
    c) an electroluminescent layer, which is located between the linear electrodes and the opposite electrode,
    wherein either the linear electrodes comprise light transmissive electrodes or the opposite electrode comprises a light transmissive electrode, 2) electric power supplying means for supplying a plurality of values of electric power in succession across the electroluminescent layer, which is located between the linear electrodes and the opposite electrode, via each of the linear electrode and the opposite electrode, and 3) optical intensity detecting means for detecting each of a plurality of optical intensities of light radiated out from the electroluminescent layer, across which the electric power has been supplied in succession, wherein the electric power supplying means controlling value of the plurality of the electric power, which is supplied across the electroluminescent layer one after another, such that each of the plurality of optical intensities, which has been detected by the optical intensity detecting means, and a predetermined optical intensity, which has been set previously, become approximately identical with each other; and wherein if a maximum electric power is supplied across the electroluminescent layer and the detected optical intensity corresponding to one of the linear electrodes is not sufficient to read out the image information, then the image information corresponding to the linear electrode is corrected by interpolation with image information corresponding to electrodes surrounding the linear electrode.

20. An image information read-out method, comprising the steps of:

i) obtaining an image recording medium, on which image information has been recorded previously, and ii) performing a scanning exposure operation for scanning the image recording medium with reading light, which has been radiated out from a line light source device, at a time of readout of the image information from the image recording medium, wherein the line light source device comprises:

1) a light source section comprises:
    a) linear electrodes,
    b) an opposite electrode, which stands facing the linear electrodes, and
    c) an electroluminescent layer, which is located between the linear electrodes and the opposite electrode,
    wherein either the linear electrodes comprise light transmissive electrodes or the opposite electrode comprises a light transmissive electrode, 2) electric power supplying means for supplying a plurality of values of electric power in succession across the electroluminescent layer, which is located between the linear electrodes and the opposite electrode, via each of the linear electrode and the opposite electrode, and 3) optical intensity detecting means for detecting each of a plurality of optical intensities of light radiated out from the electroluminescent layer, across which the electric power has been supplied in succession, wherein the electric power supplying means controlling each of a plurality of values of the electric power, which is supplied across the electroluminscent layer in succession, such that the each of the plurality of optical intensities, which has been detected by the optical intensity detecting means, and a predetermined optical intensity, which has been set previously, become approximately identical with each other; and wherein if the detected optical intensity corresponding to one of the linear electrodes comes up to an optical intensity which image information is capable of being read out from the image medium, but does not come up the predetermined optical intensity, image processing performed on the image information corresponding to the linear electrode is altered.

21. An image information read-out apparatus, comprising:
i) an image recording medium, on which image information has been recorded previously,
ii) a line light source device for radiating out reading light toward the image recording medium, and
iii) scanning exposure control section for performing a scanning exposure operation for scanning the image recording medium with the reading light, which has been radiated out from the line light source device, at the time of readout of the image information from the image recording medium, wherein the line light source device comprises:
1) a light source section comprising:
   a) linear electrodes,
   b) an opposite electrode, which stands facing the linear electrodes, and
   c) an electroluminscent layer, which is located between the linear electrodes and the opposite electrode,
   wherein either the linear electrode comprise light transmissive electrodes or the opposite electrode comprises a light transmissive electrode,
2) electric power supplying means for supplying a plurality of values of electric power in succession across the electroluminescent layer, which is located between the linear electrodes and the opposite electrode, via each of the linear electrode and the opposite electrode, and
3) optical intensity detecting means for detecting each of a plurality of optical intensities of light radiated out from the electroluminescent layer, across which the electric power has been supplied in succession, wherein the electric power supplying means controlling each value of the plurality of the electric power, which is supplied across the electroluminescent layer one after another, such that each of the plurality of optical intensities, which has been detected by the optical intensity detecting means, and a predetermined optical intensity, which has been set previously, become approximately identical with each other; and wherein if the detected optical intensity corresponding to one of the linear electrodes comes up to an optical intensity which image information is capable of being read out from the image recording medium, but does not come up to the predetermined optical intensity, image processing performed on the image information corresponding to the linear electrode is altered.

* * * * *